United States Patent
Okudaira et al.

(10) Patent No.: US 11,355,282 B2
(45) Date of Patent: Jun. 7, 2022

(54) MANUFACTURING METHOD FOR LAMINATED IRON CORE

(71) Applicant: Kuroda Precision Industries Ltd., Kawasaki (JP)

(72) Inventors: Hironobu Okudaira, Yokohama (JP); Hideo Horii, Nagano (JP); Kenichi Shindo, Kunitachi (JP)

(73) Assignee: Kuroda Precision Industries Ltd., Kawasaki (JP)

( * ) Notice: Subject to any disclaimer, the term of this patent is extended or adjusted under 35 U.S.C. 154(b) by 522 days.

(21) Appl. No.: 16/318,412

(22) PCT Filed: Jan. 9, 2017

(86) PCT No.: PCT/JP2017/000359
§ 371 (c)(1),
(2) Date: Jan. 17, 2019

(87) PCT Pub. No.: WO2018/127983
PCT Pub. Date: Jul. 12, 2018

(65) Prior Publication Data
US 2019/0259531 A1    Aug. 22, 2019

(51) Int. Cl.
*H01F 41/02* (2006.01)
*H01F 3/04* (2006.01)
(Continued)

(52) U.S. Cl.
CPC ......... *H01F 41/0206* (2013.01); *B21D 28/00* (2013.01); *H01F 3/04* (2013.01);
(Continued)

(58) Field of Classification Search
CPC .... H01F 41/0206; H01F 41/0233; H01F 3/04; H02K 15/02; H02K 15/024; B21D 28/00
See application file for complete search history.

(56) References Cited

U.S. PATENT DOCUMENTS 9,531,223 B2 * 12/2016 Blocher ................... H01F 3/02
9,669,611 B2 *  6/2017 Peruzzi .................. B32B 37/12
(Continued)

FOREIGN PATENT DOCUMENTS

JP    H0275426    3/1990
JP    H08141664   6/1996
(Continued)

OTHER PUBLICATIONS

International Search Report for PCT/JP2017-000359 dated Apr. 5, 2017, 4 pages.
Search Report for EP17890702.8 dated Jul. 24, 2020, 13 pages.

*Primary Examiner* — Jeffrey T Carley
(74) *Attorney, Agent, or Firm* — Dority & Manning, P.A.

(57) ABSTRACT

A manufacturing method for a laminated iron core includes conveying a sheet steel strip in an intermittent manner in a lift up state, with upward movement of the strip being limited by a guiding member provided on a lower holder; punching an outer shape of each iron core laminae; and applying adhesive agent to a surface of the strip before the punching. The adhesive agent is applied in a state in which a pilot pin is inserted in a pilot hole of the strip and when the strip is about to be pressed against or is being pressed against the die plate by a stripper provided on an upper holder. After application of the adhesive agent, the strip is returned to the lift up state by raising the upper holder, with a lifter and the stripper plate being in abutment with the lower and upper surfaces of the strip, respectively.

3 Claims, 31 Drawing Sheets

(51) Int. Cl.
 *B21D 28/00* (2006.01)
 *H02K 15/02* (2006.01)
(52) U.S. Cl.
 CPC ......... *H01F 41/0233* (2013.01); *H02K 15/02* (2013.01); *H02K 15/024* (2013.01)

(56) References Cited

U.S. PATENT DOCUMENTS

| | | | | |
|---|---|---|---|---|
| 2001/0043134 | A1* | 11/2001 | Decristofaro | H01F 41/0226 335/302 |
| 2004/0011456 | A1* | 1/2004 | Futamura | B29C 64/147 156/256 |
| 2004/0085174 | A1* | 5/2004 | Decristofaro | H01F 1/15333 336/178 |
| 2005/0152063 | A1* | 7/2005 | Hara | H01Q 7/08 29/603.01 |
| 2017/0136756 | A1* | 5/2017 | Chung | B32B 37/1284 |

FOREIGN PATENT DOCUMENTS

| | | | | |
|---|---|---|---|---|
| JP | 2001321850 | | 11/2001 | |
| JP | 2009-124828 | * | 6/2009 | ............ H02K 15/02 |
| JP | 2009124828 | | 6/2009 | |
| JP | 2015076970 | | 4/2015 | |
| JP | 2016092949 | | 5/2016 | |
| WO | WO2013077193 | | 5/2013 | |
| WO | WO2015194745 | | 12/2015 | |
| WO | WO2016079850 | | 5/2016 | |
| WO | WO-2016-200024 | * | 12/2016 | ............ H02K 15/02 |
| WO | WO2016200024 | | 12/2016 | |

* cited by examiner

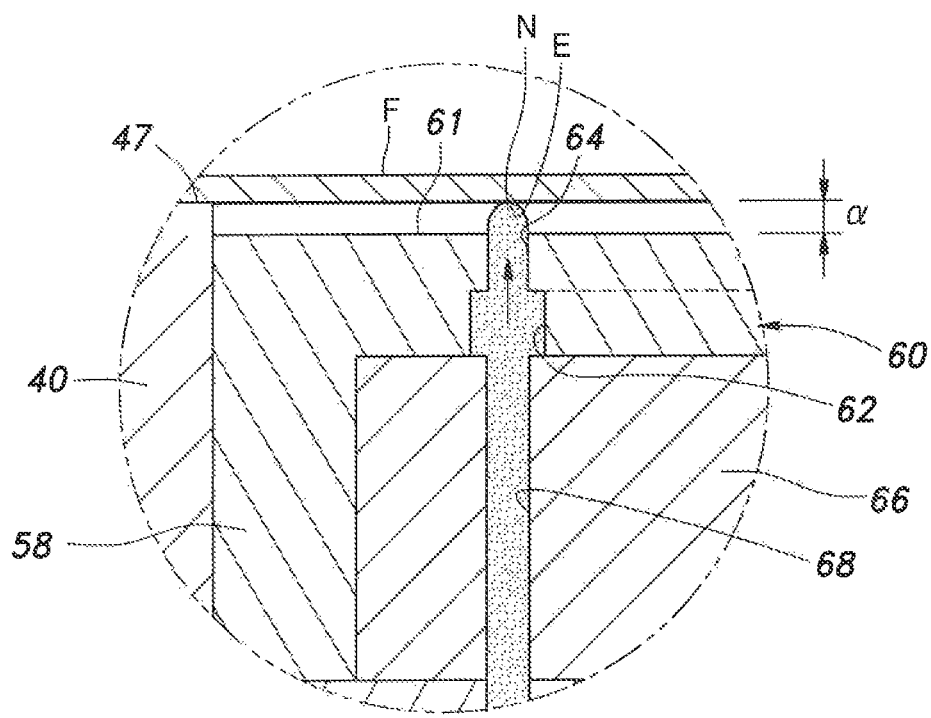

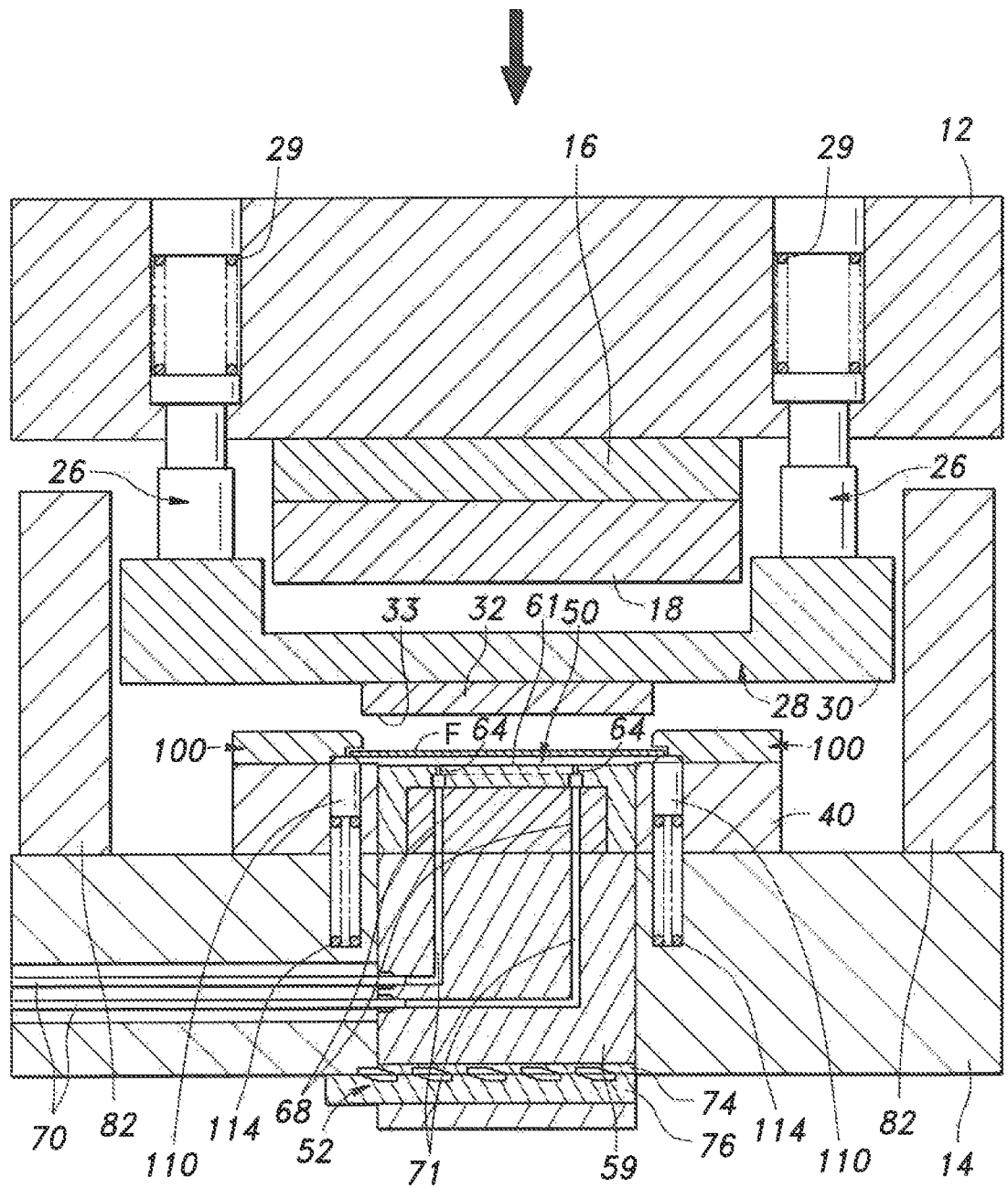

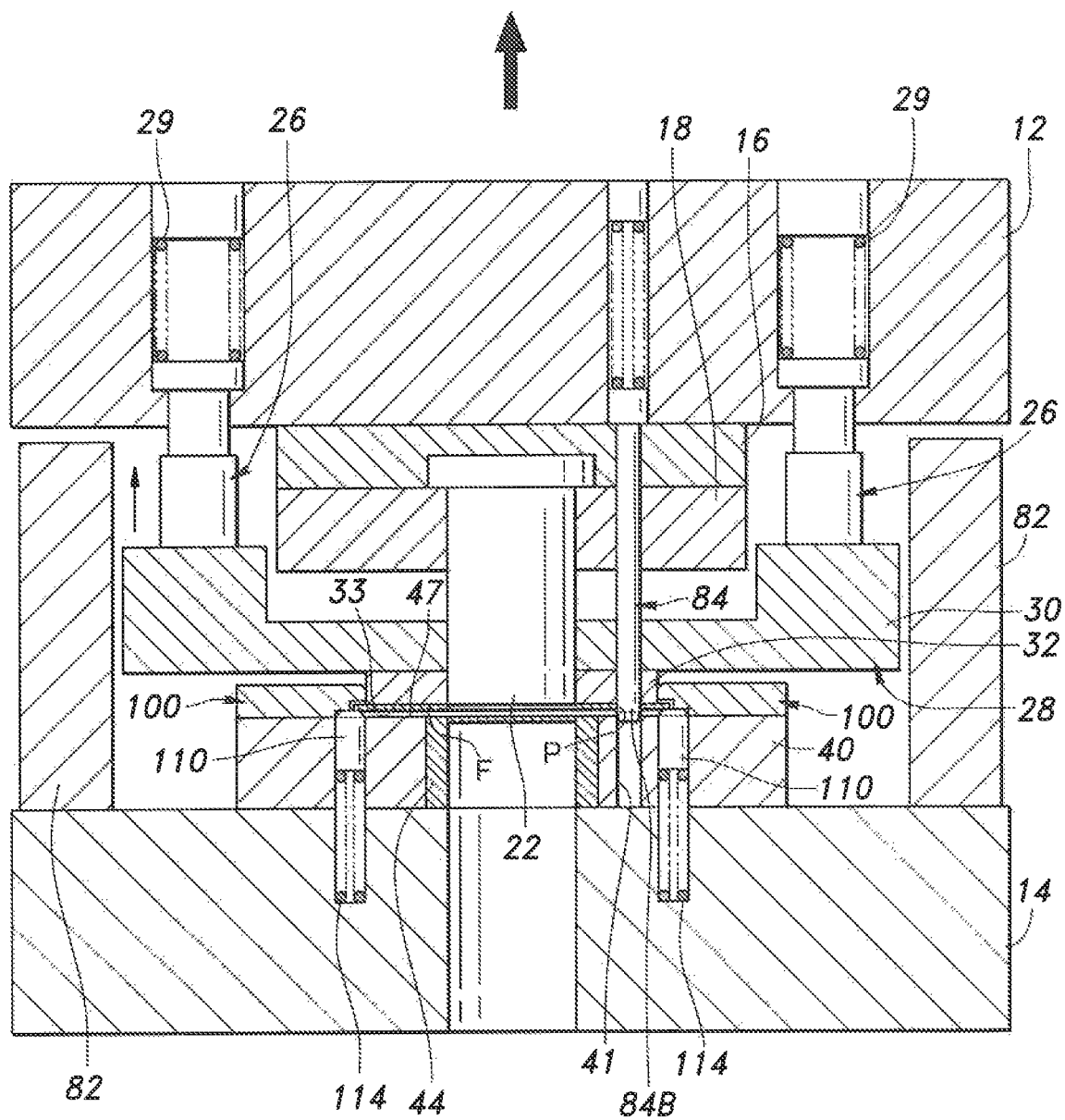
Fig.14A
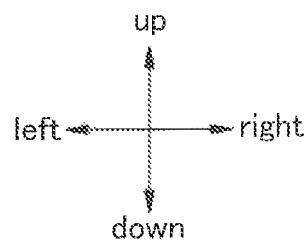

Fig.15A
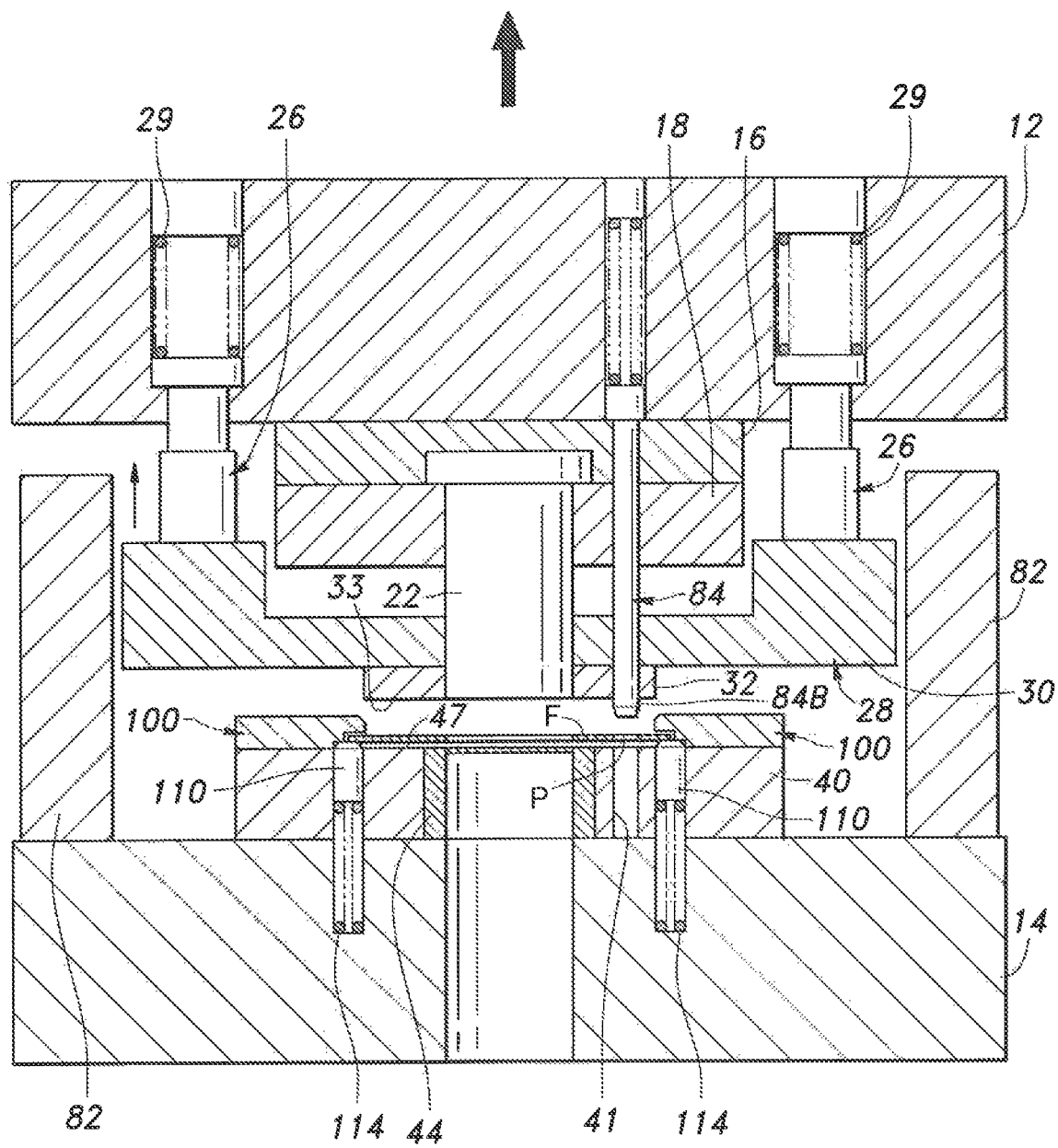
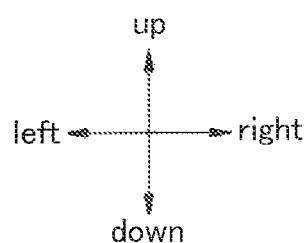

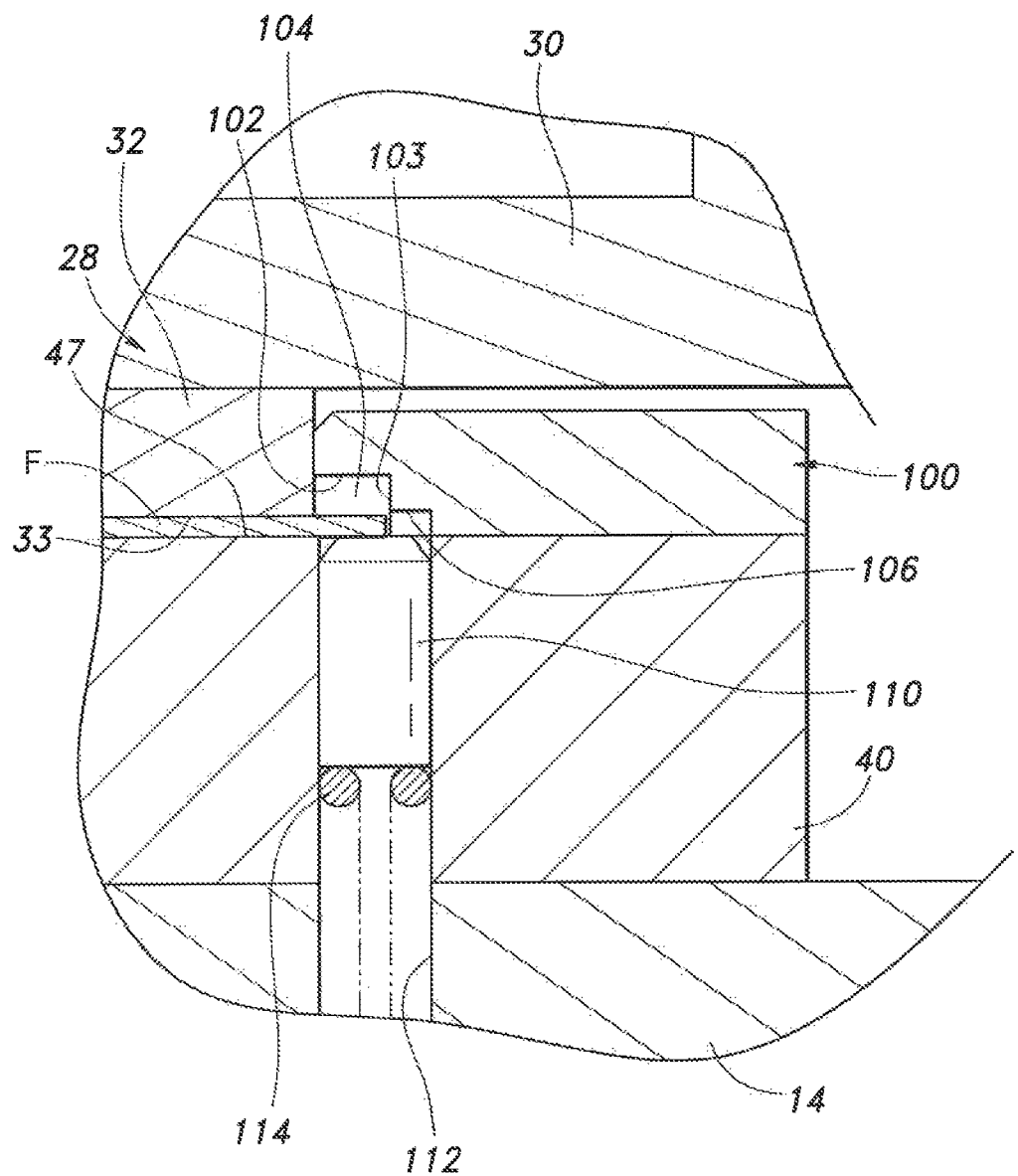

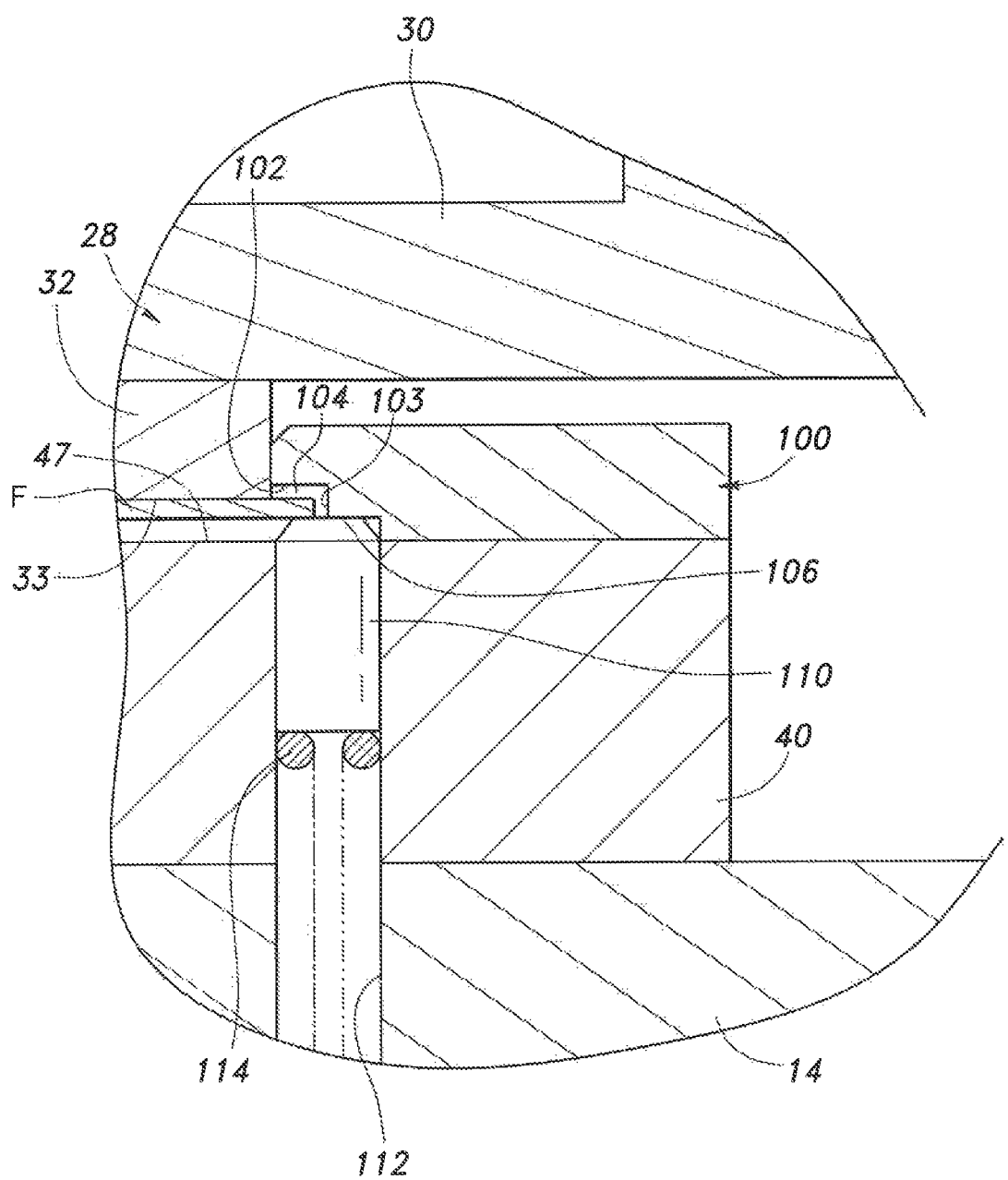

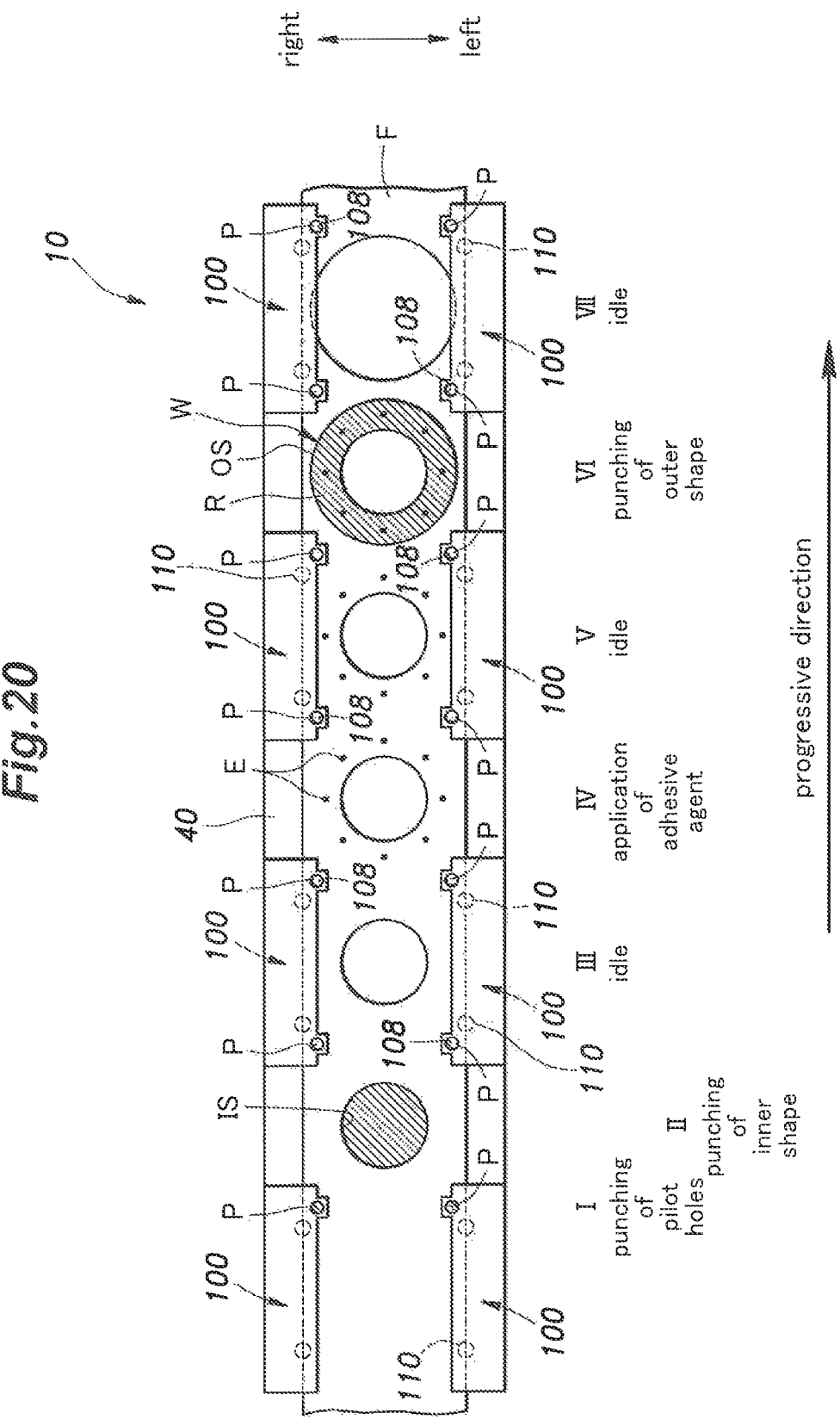

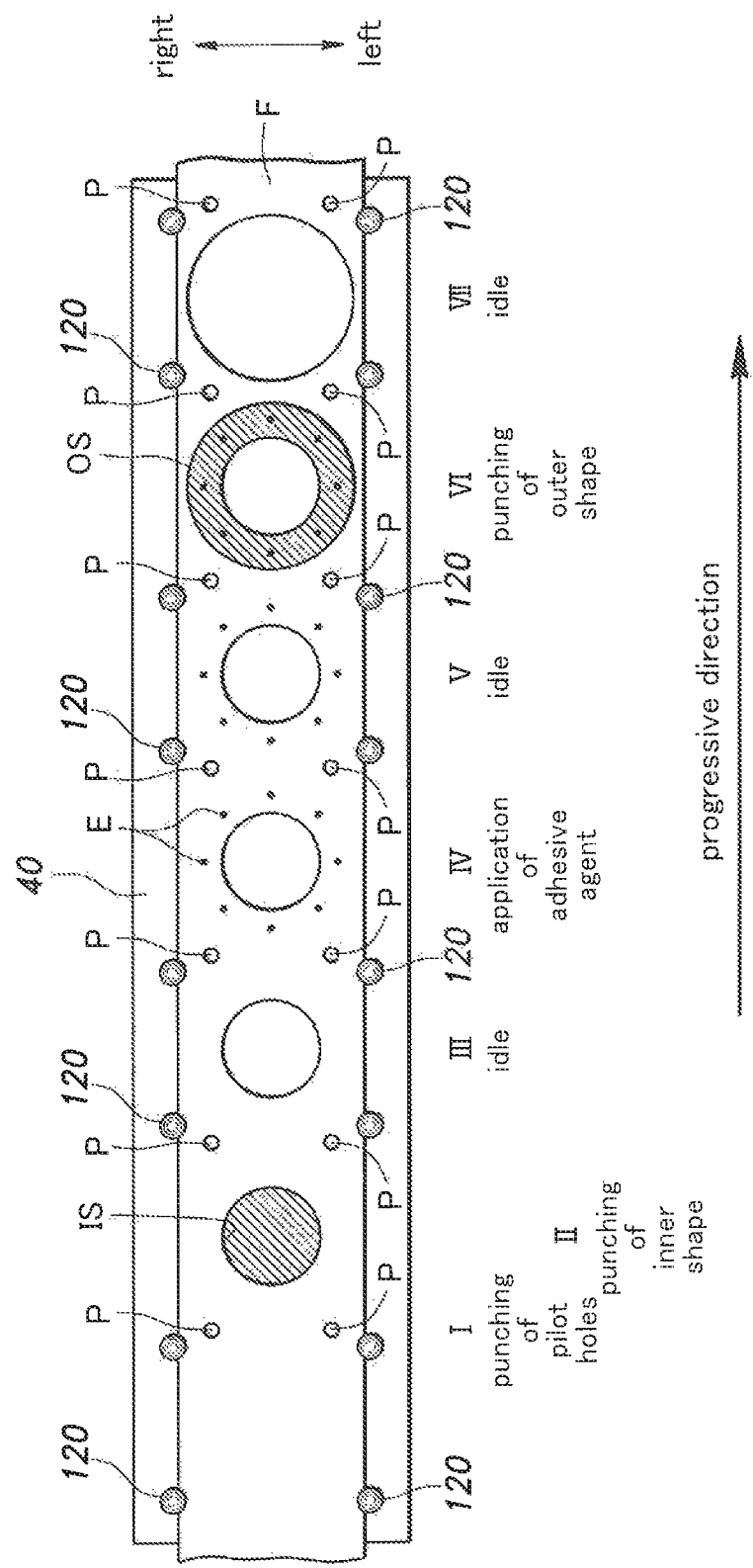

MANUFACTURING METHOD FOR LAMINATED IRON CORE

CROSS REFERENCE TO RELATED APPLICATIONS

This application is the U.S. National Stage entry of International Application Number PCT/JP2017/000359 filed under the Patent Cooperation Treaty having a filing date of Jan. 9, 2017, which is incorporated herein by reference.

TECHNICAL FIELD

The present invention relates to a manufacturing apparatus and a manufacturing method for a laminated iron core, and particularly to a manufacturing apparatus and a manufacturing method for a bonded-type laminated iron core formed by bonding a plurality of stacked iron core laminae to each other by an adhesive agent.

BACKGROUND ART

As a laminated iron core used in a stator and a rotor of a rotary electric machine, a bonded-type laminated iron core is known. The bonded-type laminated iron core is formed as follows. That is, iron core laminae are punched from a sheet steel strip conveyed in an intermittent manner by a progressive die including a plurality of punching dies (die sets) each formed by a punch and a die, and the iron core laminae are sequentially stacked in a die, and are bonded to each other by an adhesive agent such as an epoxy resin adhesive agent (Patent Literatures 1 and 2).

PRIOR ART DOCUMENTS

Patent Literature

Patent literature 1: Japanese Patent Laid-Open No. 2001-321850
Patent literature 2: Japanese Patent Laid-Open No. 2009-124828

SUMMARY OF INVENTION

Technical Problem

The application of the adhesive agent to an adhesive agent applying surface of each iron core lamina (sheet steel strip) needs to be accurately performed on predetermined positions on the adhesive agent applying surface so that a bond strength is obtained as designed and dripping and the like of the adhesive agent to the outside is prevented. In addition, it is required that the adhesive agent on the adhesive agent applying surface is not spread or scattered to the surroundings due to the vibration and the like of the iron core lamina (sheet steel strip) caused when the iron core lamina is moved.

The problem to be solved by the present invention is to accurately apply an adhesive agent on an adhesive agent applying surface.

Solution to Problem

A manufacturing apparatus for a laminated iron core according to the present invention is a manufacturing apparatus for a laminated iron core formed by stacking and bonding iron core laminae each formed by punching a sheet steel strip into a predetermined shape, the manufacturing apparatus including: an upper holder and a lower holder; a plurality of punches and dies provided on the upper holder and the lower holder, respectively, the plurality of punches and dies sequentially punching the iron core laminae from the sheet steel strip conveyed in an intermittent manner; a guiding member provided on the lower holder, the guiding member guiding conveyance of the sheet steel strip along an intermittent conveyance direction of the sheet steel strip and limiting upward movement of the sheet steel strip; and an adhesive agent applying apparatus provided on at least one of the upper holder and the lower holder, the adhesive agent applying apparatus applying an adhesive agent to an adhesive agent applying surface at a section of the sheet steel strip corresponding to each iron core lamina.

According to this configuration, the adhesive agent is applied to the adhesive agent applying surface in a state in which the upward movement of the sheet steel strip is limited by the guiding member, and hence the adhesive agent is accurately applied on the adhesive agent applying surface.

The guiding member has a structure for limiting the movement of the sheet steel strip in the right and left directions by coming into abutment with the sheet steel strip in addition to a structure for limiting the upward movement of the sheet steel strip by coming into abutment with the sheet steel strip, and guides the intermittent conveyance of the sheet steel strip.

In that case, the adhesive agent is applied to the adhesive agent applying surface in a state in which the movement of the sheet steel strip is limited in the right and left directions in addition to the upward direction, and hence the adhesive agent is applied to the adhesive agent applying surface in an even more accurate manner.

The manufacturing apparatus for a laminated iron core according to the present invention preferably further includes a pilot pin provided on the upper holder, the pilot pin being configured to be inserted through a pilot hole formed in the sheet steel strip so as to perform positioning of the sheet steel strip in each conveyance position.

According to this configuration, the adhesive agent is applied to the adhesive agent applying surface in a state in which the pilot pin is inserted through the pilot hole formed in the sheet steel strip, and hence the adhesive agent is accurately applied on the adhesive agent applying surface.

The manufacturing apparatus for a laminated iron core according to the present invention preferably further includes a stripper plate provided on the upper holder so as to be displaceable in a vertical direction, the stripper plate having a lower surface opposed to upper surfaces of the dies.

According to this configuration, the vertical movement of the sheet steel strip can be limited by the stripper plate, and hence the adhesive agent is accurately applied on the adhesive agent applying surface.

The manufacturing apparatus for a laminated iron core according to the present invention preferably further includes a stripper spring that biases the stripper plate toward the lower holder, and the stripper plate is configured to press the sheet steel strip against the upper surfaces of the dies by a spring force of the stripper spring.

According to this configuration, the adhesive agent may be applied to the adhesive agent applying surface when the sheet steel strip is about to be pressed against or is being pressed against the dies by the stripper plate, and the adhesive agent is accurately applied on the adhesive agent applying surface.

In the manufacturing apparatus for a laminated iron core according to the present invention, the stripper plate is preferably configured to press the sheet steel strip against the upper surfaces of the dies until the punches come out of the dies, and more preferably until the punches come out of the sheet steel strip.

According to this configuration, in the ascending process of the upper holder after the punching, a state in which the sheet steel strip is pressed against the upper surface of the die by the stripper plate is maintained until the punches come out of the die or until the punches come out of the sheet steel strip, and hence the swinging of the sheet steel strip in the ascending process of the upper holder is suppressed, and the scattering of the adhesive agent applied on the sheet steel strip is suppressed.

In the manufacturing apparatus for a laminated iron core according to the present invention, the pilot pin preferably includes a straight shaft portion, and the straight shaft portion is preferably positioned to protrude downward from the lower surface of the stripper plate in a state in which the stripper plate is in a most lowered position with respect to the upper holder by being biased by the stripper spring.

According to this configuration, in the descending process of the upper holder, the straight shaft portion of the pilot pin enters the pilot hole before the lower surface of the stripper plate comes into abutment with the sheet steel strip, and hence the positioning of the sheet steel strip is smoothly performed without being obstructed by the restriction of the sheet steel strip by the stripper plate.

The manufacturing apparatus for a laminated iron core according to the present invention preferably further includes a plurality of lifters provided on the lower holder so as to be displaceable in a vertical direction, the plurality of lifters separating the sheet steel strip from upper surfaces of the dies by coming into abutment with a lower surface of the sheet steel strip.

According to this configuration, the sheet steel strip can be lifted up from the upper surfaces of the dies when the sheet steel strip is conveyed in an intermittent manner, and thus, even when the adhesive agent applying surface is the lower surface of the sheet steel strip, the adhesive agent applied on the adhesive agent applying surface is not rubbed by the upper surfaces of the dies.

The manufacturing apparatus for a laminated iron core according to the present invention preferably further includes: a plurality of lifters provided on the lower holder so as to be displaceable in a vertical direction, the plurality of lifters separating the sheet steel strip from upper surfaces of the dies by coming into abutment with a lower surface of the sheet steel strip; and a plurality of lifter springs that bias the lifters upward so as to separate the sheet steel strip from the upper surfaces of the dies, with the stripper plate being in abutment with an upper surface of the sheet steel strip and the lifters being in abutment with the lower surface of the sheet steel strip, when the stripper plate ascends.

According to this configuration, the iron core lamina is returned to the lift up state (separated state), with the iron core lamina being vertically supported by the lifter and the stripper plate, after the application of the adhesive agent, and hence the swinging of the sheet steel strip in the lift up process of the sheet steel strip is suppressed, and the scattering of the adhesive agent applied on the sheet steel strip is suppressed.

In the manufacturing apparatus for a laminated iron core according to the present invention, each of the lifters preferably serves as the guiding member.

According to this configuration, the number of parts is reduced.

When the lifters also serve as the guiding members, the lifters only need to be formed by lifter pins each having a circumferential groove formed in the outer circumference of an upper part thereof and have a structure such that the right and left side edge portions of the sheet steel strip enter the circumferential grooves. In that case, in a state in which the sheet steel strip is lifted up by the lifters, the upward movement and the downward movement of the sheet steel strip are limited in accordance with the vertical widths of the circumferential grooves, and the flapping of the sheet steel strip in the intermittent conveyance is suppressed.

In the manufacturing apparatus for a laminated iron core according to the present invention, the adhesive agent applying apparatus is preferably a transfer type including a plurality of discharge holes that discharge the adhesive agent toward the adhesive agent applying surface so as to transfer the adhesive agent to each of a plurality of predetermined positions on the adhesive agent applying surface.

According to this configuration, the adhesive agent is accurately applied on the adhesive agent applying surface by transferring.

In the manufacturing apparatus for a laminated iron core according to the present invention, the adhesive agent applying apparatus preferably includes: an adhesive agent supplying apparatus that supplies the adhesive agent to each of the discharge holes with a predetermined pressure; and an advance-retreat driving apparatus that moves the discharge holes between a transfer position in which transferring of the adhesive agent to the adhesive agent applying surface is possible and a non-transfer position in which the discharge holes are retreated from the transfer position and transferring of the adhesive agent is not possible.

According to this configuration, the transfer and the non-transfer of the adhesive agent on the adhesive agent applying surface are selectively set only by selectively setting the position of the discharge holes to either one of the transfer position and the non-transfer position.

The manufacturing apparatus for a laminated iron core according to the present invention is a manufacturing apparatus for a laminated iron core formed by stacking and bonding iron core laminae each formed by punching a sheet steel strip into a predetermined shape, the manufacturing apparatus including: an upper holder and a lower holder; a plurality of punches and dies provided on the upper holder and the lower holder, the plurality of punches and dies sequentially punching the iron core laminae from the sheet steel strip conveyed in an intermittent manner; a pilot pin provided on the upper holder, the pilot pin being configured to be inserted through a pilot hole formed in the sheet steel strip so as to perform positioning of the sheet steel strip in each conveyance position; a stripper plate provided on the upper holder so as to be displaceable in a vertical direction, the stripper plate having a lower surface opposed to upper surfaces of the dies; a stripper spring that biases the stripper plate toward the lower holder; a plurality of lifters provided on the lower holder so as to be displaceable in a vertical direction, the plurality of lifters coming into abutment with a lower surface of the sheet steel strip; a plurality of lifter springs that bias the lifters upward so as to lift the sheet steel strip from the upper surfaces of the dies, with the stripper plate being in abutment with an upper surface of the sheet steel strip and the lifters being in abutment with the lower surface of the sheet steel strip, when the stripper plate ascends; and an adhesive agent applying apparatus provided on at least one of the upper holder and the lower holder, the adhesive agent applying apparatus applying an adhesive agent to an adhesive agent applying surface at a section of the sheet steel strip corresponding to each iron core lamina.

According to this configuration, the adhesive agent may be applied to the adhesive agent applying surface in a state in which the pilot pin is inserted through the pilot hole in the sheet steel strip and when the sheet steel strip is about to be pressed against or is being pressed against the upper surfaces of the dies by the stripper plate, and thus, the adhesive agent is accurately applied on the adhesive agent applying surface. In addition, the sheet steel strip is returned to the lift up state with the sheet steel strip being vertically supported by the lifters and the stripper plate after the application of the adhesive agent, and hence the swinging of the sheet steel strip in the raising process of the sheet steel strip is suppressed, and the scattering of the adhesive agent applied on the sheet steel strip is suppressed.

A manufacturing method for a laminated iron core according to the present invention is a manufacturing method for a laminated iron core formed by stacking and bonding iron core laminae each formed by punching a sheet steel strip into a predetermined shape with use of a press apparatus including an upper holder and a lower holder, the manufacturing method including: a conveyance step of conveying the sheet steel strip in an intermittent manner, with an upward movement of the sheet steel strip being limited and conveyance of the sheet steel strip along an intermittent conveyance direction being guided by a guiding member provided on the lower holder; a punching step of punching an outer shape of each of the iron core laminae with a punch and a die provided on the upper holder and the lower holder by lowering the upper holder; and an applying step of applying an adhesive agent to an adhesive agent applying surface of the sheet steel strip with an adhesive agent applying apparatus provided on at least one of the upper holder and the lower holder before the punching step.

According to this manufacturing method, the adhesive agent is applied to the adhesive agent applying surface in a state in which the intermittent conveyance of the sheet steel strip is guided by the guiding member and the upward movement of the sheet steel strip is limited by the guiding member, and hence the adhesive agent is accurately applied on the adhesive agent applying surface.

In the manufacturing method for a laminated iron core according to the present invention, the conveyance step preferably includes conveying the sheet steel strip in an intermittent manner in a lift up state in which the sheet steel strip is separated from an upper surface of the die provided on the lower holder by a lifter provided on the lower holder so as to be vertically movable and biased upward by a lifter spring in a raised state of the upper holder.

According to this manufacturing method, even when the adhesive agent applying surface is the lower surface of the sheet steel strip, the adhesive agent applied on the adhesive agent applying surface is not rubbed by the upper surface of the die.

The manufacturing method for a laminated iron core according to the present invention preferably further includes a pilot insertion step of inserting a pilot pin provided on the upper holder into a pilot hole formed in the sheet steel strip in middle of descent of the upper holder after the conveyance step finishes.

According to this manufacturing method, the positioning of the sheet steel strip is accurately performed, and hence the adhesive agent is accurately applied on the adhesive agent applying surface.

The manufacturing method for a laminated iron core according to the present invention preferably further includes a pressing step of pressing, in middle of descent of the upper holder after the pilot insertion step finishes, the sheet steel strip against the upper surface of the die provided on the lower holder with a stripper plate hung from the upper holder by a stripper spring, along with a descending movement of the lifter.

According to this manufacturing method, the sheet steel strip is pressed against the upper surface of the die after the pilot insertion step finishes, in other words, the pilot pin is inserted into the pilot hole in the sheet steel strip before the sheet steel strip is pressed against the upper surface of the die and is restricted, and hence the pilot pin is smoothly inserted into the pilot hole.

In the manufacturing method for a laminated iron core according to the present invention, the applying step preferably includes applying the adhesive agent in a state in which the pilot pin is inserted in the pilot hole and when the sheet steel strip is about to be pressed against or is being pressed against the upper surface of the die by the stripper plate along with the descending movement of the lifter, and returning the sheet steel strip to the lift up state by raising the upper holder after application of the adhesive agent finishes, with the lifter being in abutment with a lower surface of the sheet steel strip along with an ascending movement of the lifter and with the stripper plate being in abutment with the upper surface of the sheet steel strip.

According to this manufacturing method, the adhesive agent is applied to the adhesive agent applying surface when the sheet steel strip is about to be pressed against or is being pressed against the die by the stripper plate, and hence the adhesive agent is accurately applied on the adhesive agent applying surface. In addition, the swinging of the sheet steel strip in the ascending process of the upper holder is suppressed, and the scattering of the adhesive agent applied on the sheet steel strip is suppressed.

The manufacturing method for a laminated iron core according to the present invention is a manufacturing method for a laminated iron core formed by stacking and bonding iron core laminae each formed by punching a sheet steel strip into a predetermined shape with use of a press apparatus including an upper holder and a lower holder, the manufacturing method including: a conveyance step of conveying the sheet steel strip in an intermittent manner in a lift up state in which the sheet steel strip is separated from upper surfaces of dies provided on the lower holder by a lifter provided on the lower holder so as to be vertically movable and biased upward by a lifter spring in a raised state of the upper holder; a pilot insertion step of inserting a pilot pin provided on the upper holder into a pilot hole formed in the sheet steel strip in middle of descent of the upper holder after the conveyance step finishes; a pressing step of pressing, in middle of descent of the upper holder after the pilot insertion step finishes, the sheet steel strip against the upper surfaces of the dies provided on the lower holder with a stripper plate hung from the upper holder by a stripper spring, along with a descending movement of the lifter; a punching step of sequentially punching an inner shape and an outer shape of each iron core lamina with a plurality of die sets each formed by a punch and a die provided on the upper holder and the lower holder at a plurality of press positions set in a row in an intermittent conveyance direction at intervals, by further lowering the upper holder after the pressing step finishes; and an applying step of applying an adhesive agent to the adhesive agent applying surface of the sheet steel strip with an adhesive agent applying apparatus set between the press position for punching the inner shape and the press position for punching the outer shape so as to be in a row with the press positions and provided on at least one of the upper holder and the lower holder, in which the applying step includes applying the adhesive agent in a state in which the pilot pin is inserted in the pilot hole and when the sheet steel strip is about to be pressed against or is being pressed against the upper surfaces of the dies by the stripper plate along with the descending movement of the lifter, and returning the sheet steel strip to the lift up state by raising the upper holder after application of the adhesive agent finishes, with the lifter being in abutment with a lower surface of the sheet steel strip along with an ascending movement of the lifter and with the stripper plate being in abutment with the upper surface of the sheet steel strip.

According to this manufacturing method, the adhesive agent is applied to the adhesive agent applying surface in the state in which the pilot pin is inserted through the pilot hole in the sheet steel strip and when the sheet steel strip is about to be pressed against or is being pressed against the upper surface of the die by the stripper plate, and hence the adhesive agent is accurately applied on the adhesive agent applying surface. In addition, after the application of the adhesive agent, the sheet steel strip is returned to the lift up state with the sheet steel strip being vertically supported by the lifter and the stripper plate, and hence the swinging of the sheet steel strip in the lift up process of the sheet steel strip is suppressed and the scattering of the adhesive agent applied on the sheet steel strip is suppressed.

In the manufacturing method for a laminated iron core according to the present invention, the applying step preferably includes a step of transferring the adhesive agent to each of a plurality of predetermined positions on the adhesive agent applying surface by discharging the adhesive agent toward the adhesive agent applying surface from each of a plurality of discharge holes.

According to this manufacturing method, the adhesive agent is applied to the adhesive agent applying surface finely and accurately by transferring.

In the manufacturing method for a laminated iron core according to the present invention, each iron core lamina includes a plurality of teeth portions, and has at least one of the application points placed on the teeth portion.

According to this manufacturing method, the bonding between adjacent iron core laminae is performed also in the teeth portions, and the laminated iron core having a high bond strength is produced.

Advantageous Effect of Invention

According to the manufacturing apparatus and the manufacturing method for a laminated iron core of the present invention, the adhesive agent is accurately applied on the adhesive agent applying surface.

BRIEF DESCRIPTION OF DRAWINGS

FIG. 7 is an enlarged cross-sectional view of the main section of the adhesive agent apparatus according to this embodiment.

FIG. 9B is a cross-sectional view of the adhesive agent applying station of the manufacturing apparatus according to this embodiment in the descending process 1.

FIG. 14A is a cross-sectional view of the inner shape punching station of the manufacturing apparatus according to this embodiment in an ascending process 2.

FIG. 15A is a cross-sectional view of the inner shape punching station of the manufacturing apparatus according to this embodiment in an ascending process 3.

FIG. 18 is an enlarged cross-sectional view of the lift-up portion of the manufacturing apparatus according to this embodiment in the bottom dead center state.

FIG. 19 is an enlarged cross-sectional view of the lift-up portion of the manufacturing apparatus according to this embodiment in the ascending process 1.

FIG. 20 is an explanatory view illustrating an example of another embodiment of a strip layout in a progressive die machine used in the manufacture of the laminated iron core illustrated in FIG. 3.

FIG. 21 is an explanatory view illustrating an example of another embodiment of a strip layout in a progressive die machine used in the manufacture of the laminated iron core illustrated in FIG. 3.

DESCRIPTION OF EMBODIMENTS

Preferred embodiments according to the present invention are described with reference to the accompanying drawings.

First, as a specific example of a laminated iron core, a laminated iron core used in a stator of a stepping motor is described with reference to FIG. 1.

The laminated iron core is obtained by stacking a plurality of iron core laminae A having the same shape. Each iron core lamina A is obtained by punching a sheet steel strip or a strip F into a predetermined shape by press working using a progressive die, and includes an annular yoke section B obtained by outer shape punching, a plurality of teeth portions (magnetic pole portions) C formed by inner shape punching and protruding radially inward from the yoke section B, and a plurality of through holes D formed in the yoke section B through punching. Adjacent iron core laminae A are bonded to each other by an adhesive agent applied to a plurality of application points E1 and E2 on one surface (adhesive agent applying surface) of the yoke section B and the teeth portions C in a round dot shape.

The adhesive agent used here includes an anaerobic adhesive agent (an adhesive agent+a hardening accelerator), a one-component epoxy resin adhesive agent, a two-component epoxy resin adhesive agent (a first adhesive agent liquid+a second adhesive agent liquid or a main agent+an initiator), a thermosetting adhesive agent such as an acrylic resin adhesive agent, a moisture-curing adhesive agent, and the like.

Figure 1:
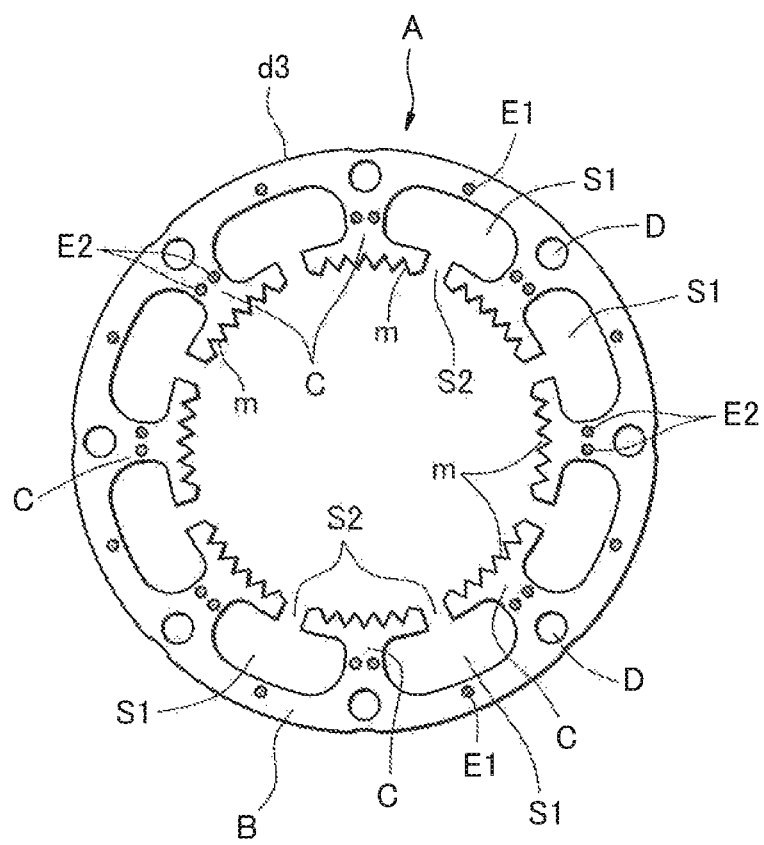
FIG. 1 is a plan view illustrating an example of an iron core lamina used in a stator of a stepping motor.

Note that in FIG. 1, the application points E1 and E2 are illustrated on the upper surface of the iron core lamina A for convenience of the description, but the application points E1 and E2 are actually set on the lower surface side of the iron core lamina A so that the adhesive agent is applied to the lower surface (adhesive agent applying surface) of the iron core lamina A.

Figure 2:
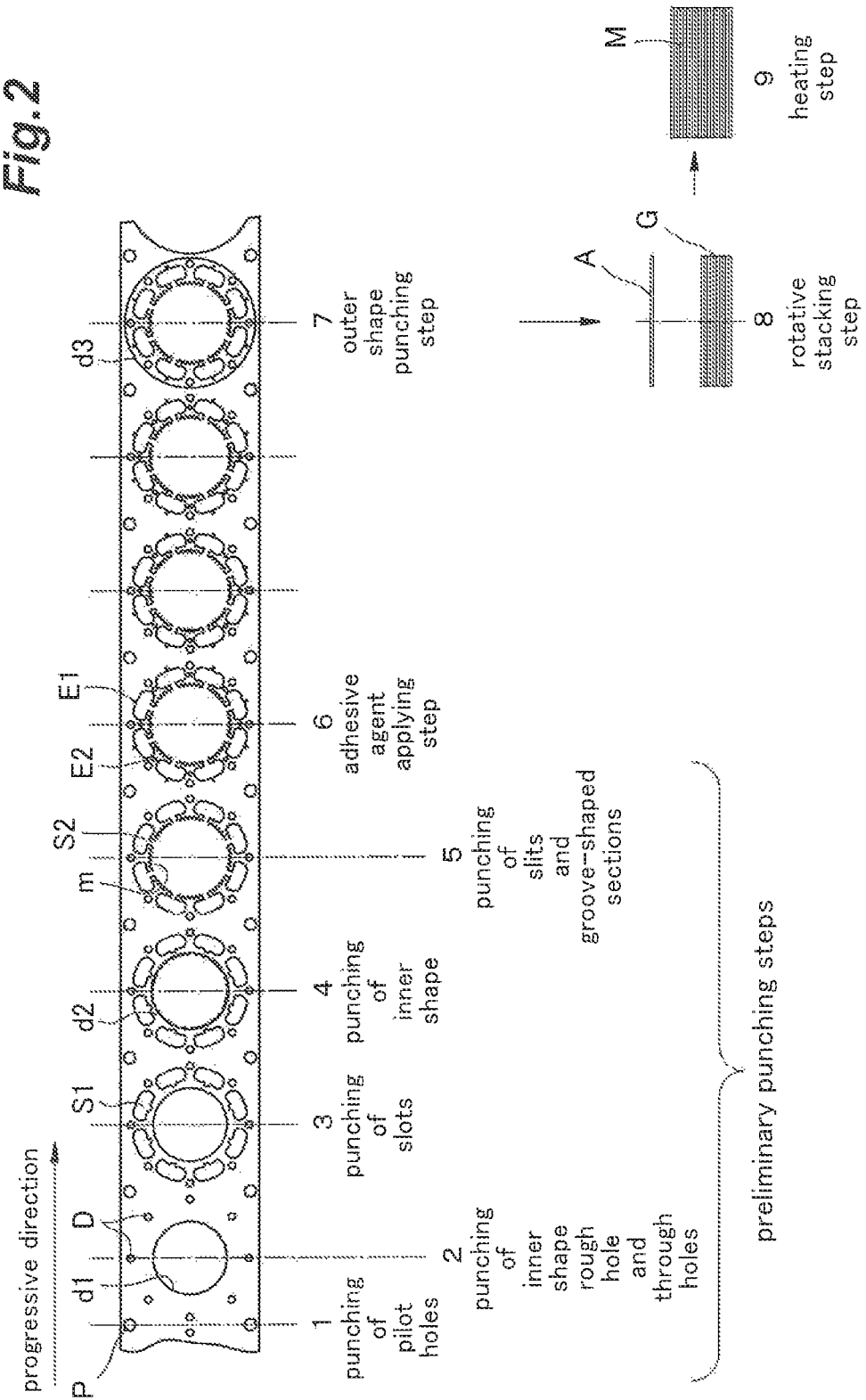
FIG. 2 is an explanatory view illustrating a strip layout in a progressive die machine used in the manufacture of the iron core lamina illustrated in FIG. 1.

As illustrated in FIG. 2, the steps of manufacturing the laminated iron core include preliminary punching steps 1 to 5, an adhesive agent applying step 6, an outer shape punching step 7, a rotative stacking step 8, and a heating step 9 in sequence in accordance with the intermittent conveyance of the strip F in the progressive die machine (a manufacturing apparatus for the laminated iron core).

In the preliminary punching steps, punching 1 of pilot holes P, punching 2 of an inner shape rough hole d1 and through holes D, punching 3 of slots S1, punching 4 of an inner shape d2, and punching 5 of slits S2 between teeth and tooth tip groove-shaped sections m are sequentially performed on the strip F by die sets (not shown) each formed by a punch and a die having shapes corresponding to the related punching, whereby a basic shape besides the outer shape punching of the iron core lamina A is formed.

The adhesive agent applying step 6 is performed following the preliminary punching steps 1 to 5. The application of the adhesive agent to the strip F is performed on the plurality of application points E1 set in positions corresponding to the slots S1 of the yoke section B and the application points E2 set in two positions on each teeth portion C, in a round dot shape as illustrated in detail in FIG. 1. Here, a well-known anaerobic adhesive agent is used as the adhesive agent. In FIG. 2 also, the application points E1 and E2 are illustrated on the upper surface side of the iron core lamina A for convenience of the description, but the application points E1 and E2 are actually set on the lower surface side of the iron core lamina A.

The outer shape punching step 7 is performed after the adhesive agent applying step 6 is finished. The outer shape punching step 7 is performed by a die set (not shown) formed by a punch and a die having a shape corresponding to an outer shape d3 of the iron core lamina A.

The rotative stacking step 8 is performed following the outer shape punching step 7. The die for the outer shape punching step 7 is a rotatable die, and rotates about the central axis line thereof by a predetermined angle, for example, 90 degrees each time the outer shape punching of one iron core lamina A is performed. As a result, while changing the position about the central axis line, the iron core laminae A punched in the outer shape punching step 7 are sequentially stacked on an iron core lamina group G that has been already punched out and stacked in the rotatable die. By this rotative stacking, the influence of minute thickness fluctuations that may be present in the iron core laminae A can be eliminated, and the stack height of the product (laminated iron core) can be managed with high accuracy. Then, the iron core lamina group G is sequentially pushed into a squeeze ring (not shown) positioned below the rotatable die.

When a newly punched iron core lamina A is stacked on the iron core lamina group G, the lower surface of the newly punched iron core lamina A comes into close contact with the upper surface of the iron core lamina A located in the uppermost layer of the iron core lamina group G. As a result, the adhesive agent applied on the application points E1 and E2 on the lower surface of the newly punched iron core lamina A in a round dot shape is mixed with a hardening accelerator applied in advance on the upper surface of the iron core lamina A located in the uppermost layer.

The heating step 9 is performed following the rotative stacking step 8 is finished. A heating apparatus (not shown) is provided in a lower portion of the squeeze ring, and the iron core lamina group G is heated by the heating apparatus while moving downward. Thereby, the adhesive agent between the iron core laminae A is heated and cured so that the bond strength can be increased. As the heating apparatus for the adhesive agent described above, a heater apparatus that blows hot air to the iron core lamina group G can be used, for example. After the heating by the heating apparatus, the iron core lamina group G is separated at positions of the iron core laminae A for separation, whereby a laminated iron core M formed by a predetermined number of the iron core laminae A is obtained.

Figure 3:
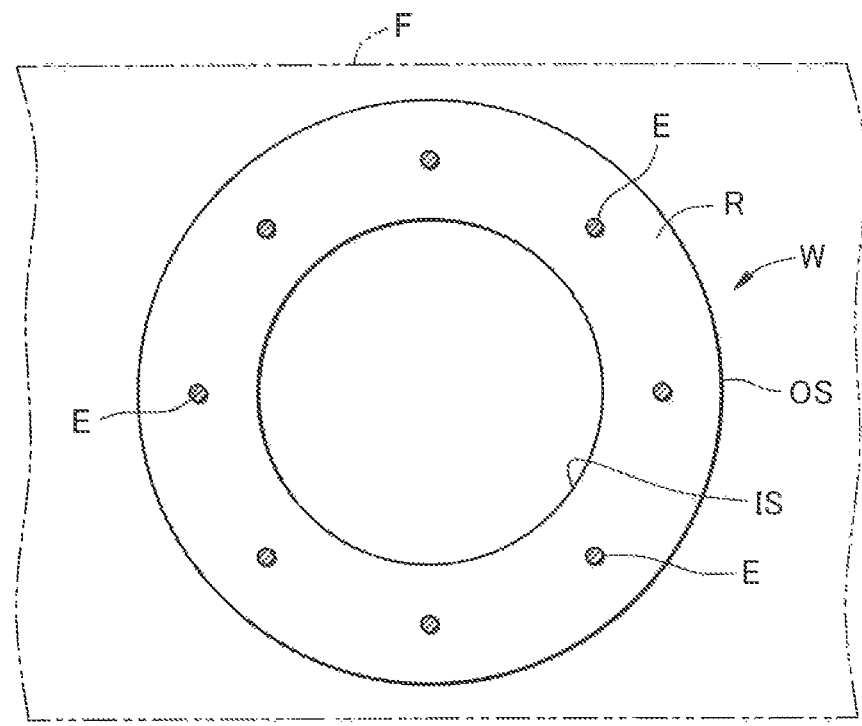
FIG. 3 is a plan view illustrating an iron core lamina schematically illustrating the iron core lamina manufactured by a manufacturing apparatus and a manufacturing method for the laminated iron core according to the present invention.

Next, one embodiment of a manufacturing apparatus 10 for the laminated iron core is described with reference to FIG. 4 and FIG. 5. Note that, in the description below, description will be made of simplified iron core laminae W having an annular shape as illustrated in FIG. 3 to simplify the description. Each iron core lamina W is formed by punching a circular inner shape IS and punching a circular outer shape OS, and the adhesive agent is applied in a dot shape on application points E set in a plurality of positions in a circumferential direction on the lower surface (adhesive agent applying surface) of an annular portion R obtained by the punching steps.

Figure 4:
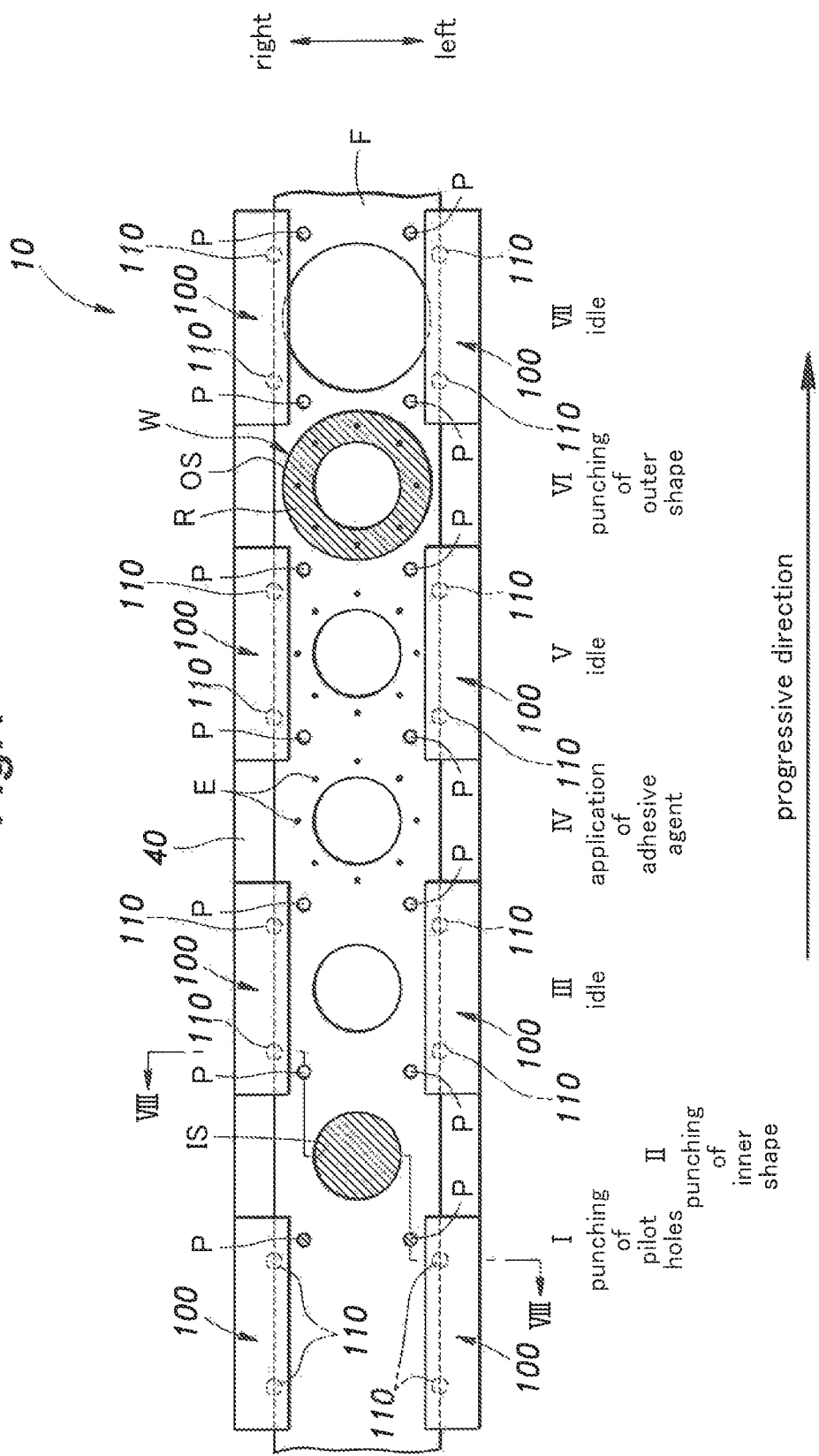
FIG. 4 is an explanatory view illustrating one embodiment of a strip layout in a progressive die machine used in the manufacture of the laminated iron core illustrated in FIG. 3.
Figure 5:
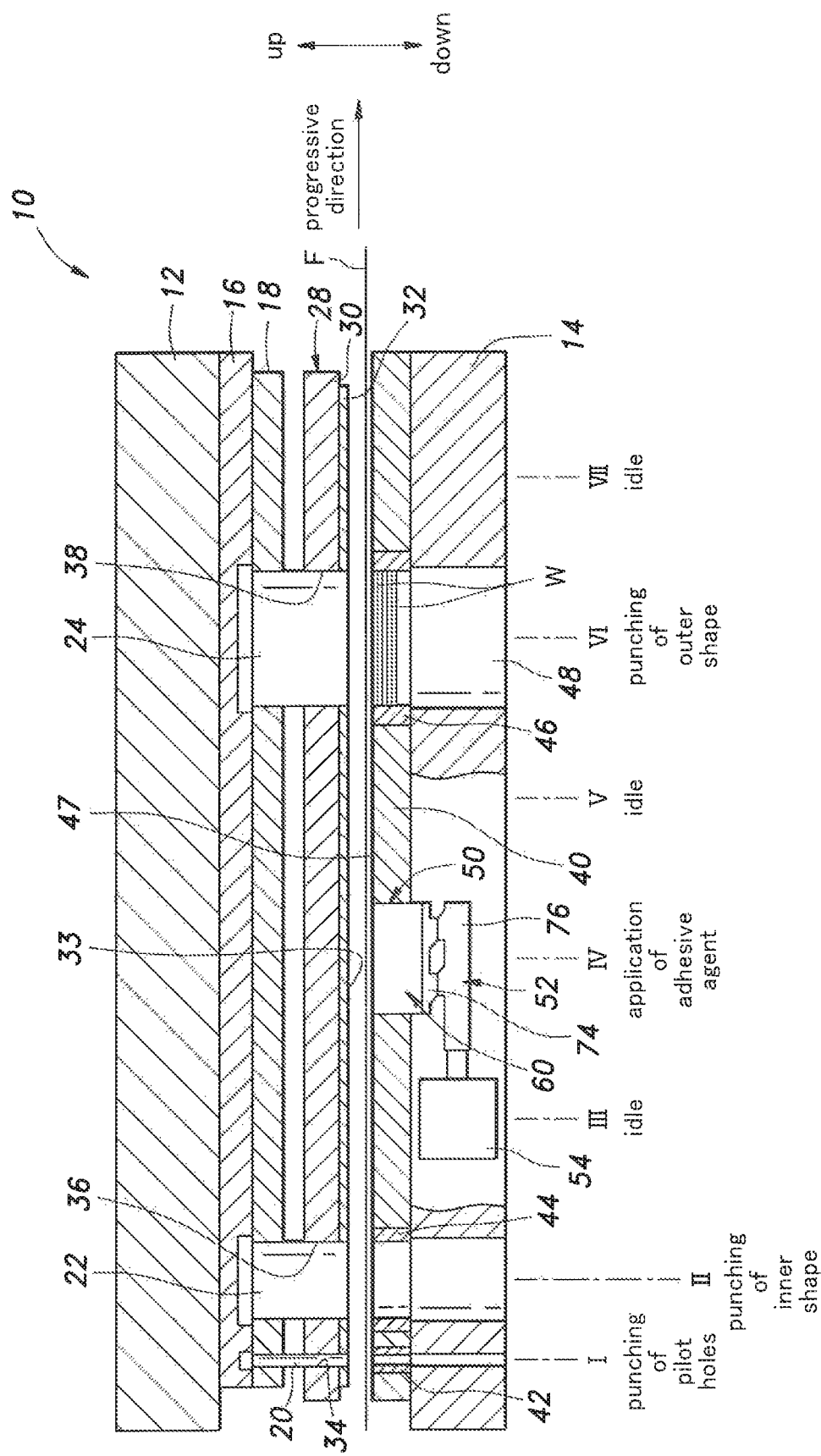
FIG. 5 is a schematic configuration diagram illustrating one embodiment of a manufacturing apparatus for a laminated iron core according to the present invention.

The manufacturing apparatus 10 employs a progressive die system, and includes a pilot hole punching station I, an inner shape punching station II, an idle station III, an adhesive agent applying station IV, an idle station V, an outer shape punching station VI, and an idle station VII in sequence in the progressive direction as illustrated in FIG. 4 and FIG. 5. The stations I, II, IV, and VI other than the idle stations III, V, and VII execute the steps in accordance with the intermittent conveyance of the strip F in the progressive direction. Note that sections to be punched in the pilot hole punching station I, the inner shape punching station II, and the outer shape punching station VI are indicated by diagonal lines. In the idle stations III, V, and VII, idle feeding of the strip F is performed.

The manufacturing apparatus 10 includes a plate-like upper holder 12 fixed to the lower surface of an upper ram (not shown) of a press machine, and a plate-like lower holder 14 fixed to the upper surface of a lower table (not shown) of the same press machine so as to directly face the upper holder 12.

Punches 20 for pilot hole punching, a punch 22 for inner shape punching, and a punch 24 for outer shape punching are attached on the lower side of the upper holder 12 at positions corresponding to the stations I, II, and VI by a back plate 16 and a punch plate 18.

A stripper 28 is supported at a place below the upper holder 12 by hanger bolts (not shown) so as to be displaceable in the vertical direction. The most lowered position of the stripper 28 with respect to the upper holder 12 is set by hanging support by the hanger bolts (not shown). The stripper 28 is formed as a joined body of a plate-like stripper main body 30 and a stripper plate 32, and a lower surface 33 of the stripper plate 32 directly faces an upper surface 47 of a die plate 40 and dies 42, 44, and 46 described below. In other words, the stripper plate 32 has the lower surface 33 that directly faces the upper surface 47 of the die plate 40 and the dies 42, 44, and 46. Punch insertion holes 34, 36, and 38 through which punches 20, 22, and 24 pass are formed in the stripper plate 32.

The plate-like die plate 40 is attached to the upper surface of the lower holder 14. A die 42 for pilot hole punching, a die 44 for inner shape punching, and a die 46 for outer shape punching are attached to the die plate 40 at positions corresponding to the punching stations I, II, and VI. The punches 20 for pilot hole punching and the respective dies 42 for pilot hole punching, the punch 22 for inner shape punching and the die 44 for inner shape punching, and the punch 24 for outer shape punching and the die 46 for outer shape punching each correspond to each other, and each form a die set.

Note that the upper surfaces of the die plate 40, the dies 42, the die 44, and the die 46 are flush with each other, and hence those upper surfaces are hereinafter collectively referred to as the upper surface 47 of the die plate 40.

An adhesive agent applying apparatus 50 is provided in a part of the die plate 40 corresponding to the adhesive agent applying station IV. The adhesive agent applying apparatus 50 is vertically moved by a cam mechanism 52 driven by a driving apparatus 54, and when in a raised position, applies (transfers) the adhesive agent on the plurality of sections (application points E) on the lower surface of the strip F in a dot shape for each press operation except for when forming an iron core lamina for separation to set the number of the iron core laminae W to be stacked.

In the pilot hole punching station I, the pilot holes P (see FIG. 4) are punched in the strip F by the punches 20 for pilot hole punching and the dies 42 for pilot hole punching for each press operation, in other words, for each intermittent conveyance of the strip F. The pilot holes P are formed near the edge portions on both sides (both of right and left sides) with respect to the direction (progressive direction) in which the strip F is conveyed in an intermittent manner.

In the inner shape punching station II, the inner shape IS (see FIG. 4) is punched in the strip F by the punch 22 for inner shape punching and the die 44 for inner shape punching for each intermittent conveyance of the strip F.

In the adhesive agent applying station IV, the adhesive agent is applied to the application points E on the lower surface of the strip F in a round dot shape by the adhesive agent applying apparatus 50 in the raised position. Note that, when forming an iron core lamina for separation to set the number of the iron core laminae W to be stacked, which takes place every predetermined number of times of the intermittent conveyance, the adhesive agent applying apparatus 50 descends to a lowered position, and hence the application of the adhesive agent to the strip F is suspended.

In the outer shape punching station VI, the outer shape OS (see FIG. 4) is punched in the strip F by the punch 24 for outer shape punching and the die 46 for outer shape punching. This punching provides a completed iron core lamina W. The produced iron core laminae W descend and are sequentially stacked in the die 46 for outer shape punching. Of the iron core laminae W stacked in the die 46 for outer shape punching, vertically adjoining iron core laminae W are bonded to each other by the adhesive agent applied on the application points E, except for the iron core laminae W for separation on which the adhesive agent is not applied.

In the outer shape punching station VI, the stack of the iron core laminae W is taken out downward from an outlet hole 48 formed in the lower holder 14 and is carried to a post-treatment step for heat-curing the adhesive agent, as necessary.

Next, the details of the adhesive agent applying apparatus 50 are described with reference to FIG. 6 and FIG. 7.

The adhesive agent applying apparatus 50 is a transfer type, and includes an application table 60 implemented as a connected body formed by an upper block 58 and a lower block 59. The application table 60 is vertically movably inserted through a holding hole 56 formed in the lower holder 14 and the die plate 40.

The cam mechanism 52 is provided below the application table 60. The cam mechanism 52 includes a fixed cam 74 formed by a plate cam fixed to the bottom portion of the lower block 59, and a moving cam 76 formed by a plate cam moveably provided on the bottom portion of the lower block 59. The moving cam 76 is connected to the driving apparatus 54, and is driven in a reciprocating manner in the right and left directions by the driving apparatus 54 when seen in FIG. 6. The fixed cam 74 includes a sawtooth shape portion having sawtooth protrusions 74A and sawtooth recesses 74B arranged alternately in the right and left directions on the lower surface thereof, and the moving cam 76 includes a sawtooth shape portion having sawtooth protrusions 76A and sawtooth recesses 76B arranged alternately on the upper surface thereof.

As illustrated in the drawings, when the moving cam 76 is in a position in which the sawtooth protrusions 74A of the fixed cam 74 and the sawtooth protrusions 76A of the moving cam 76 are aligned with each other, the application table 60 is placed in the raised position (transfer position). In the raised position, an upper surface 61 of the upper block 58 is located below the upper surface 47 of the die plate 40 by a level difference α.

Figure 6:
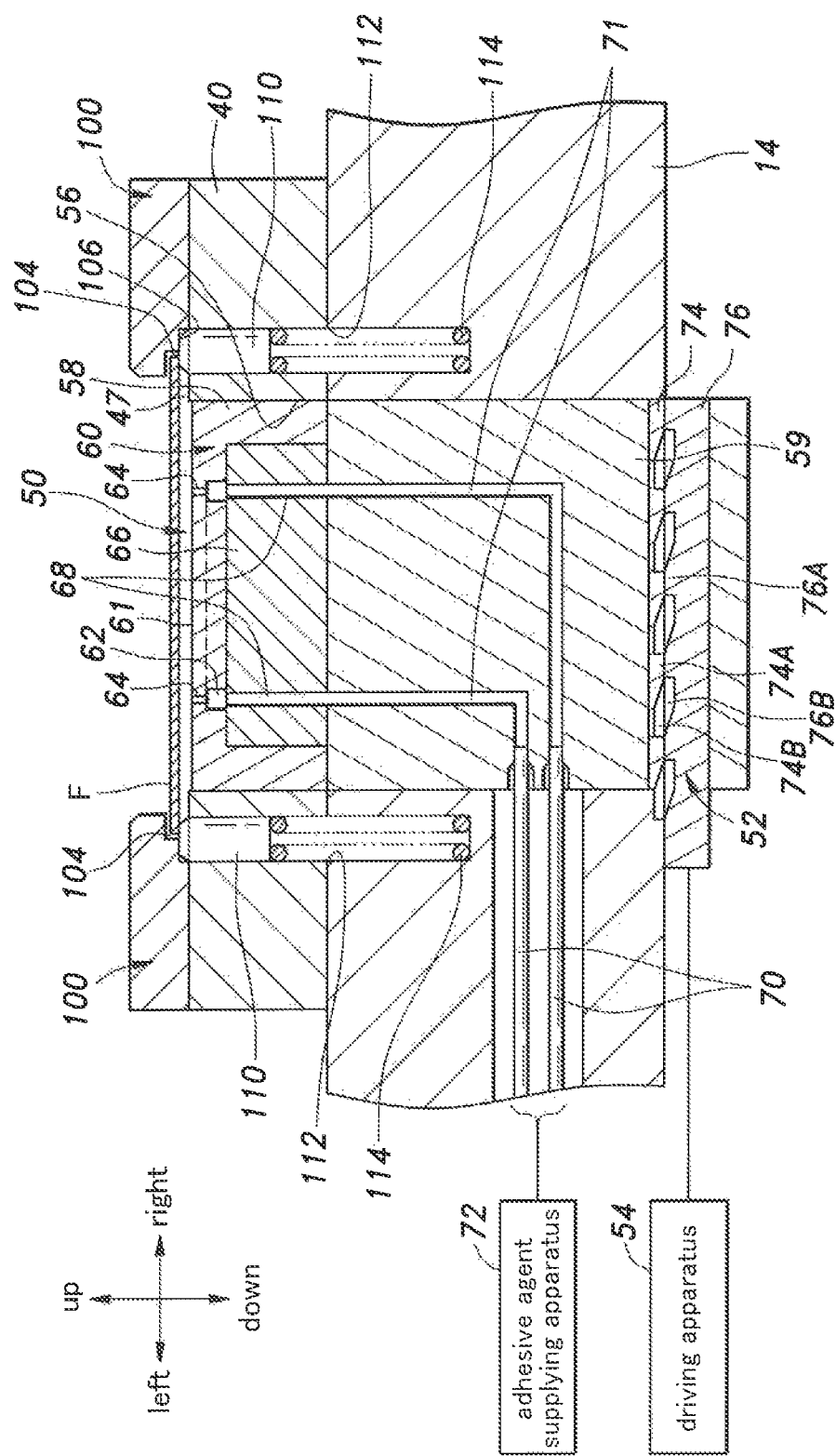
FIG. 6 is a cross-sectional view illustrating an adhesive agent apparatus used in the manufacturing apparatus for the laminated iron core according to this embodiment.

When the moving cam 76 is driven to the left by the driving apparatus 54 when seen in FIG. 6 and the moving cam 76 is placed in a position in which the sawtooth recesses 74B of the fixed cam 74 and the sawtooth protrusions 76A of the moving cam 76 are aligned with each other, the application table 60 and the fixed cam 74 descend (retreat downward), and the application table 60 is placed in the lowered position. In the lowered position (non-transfer position), the upper surface 61 of the upper block 58 is placed below the upper surface 47 of the die plate 40 by a large level difference that is larger than the level difference α.

The upper block 58 is provided with an adhesive agent accumulation portion 62 formed by an annular groove, and a plurality of discharge holes 64 each extending from the adhesive agent accumulation portion 62 to the horizontal upper surface 61 of the upper block 58 in the up-down direction (vertical direction) so as to be opened in the upper surface 61. The discharge holes 64 are placed in positions corresponding to the application points E of the strip F (iron core lamina W) located in the adhesive agent applying station IV.

An inner block 66 is attached in the upper block 58. The inner block 66 is formed with adhesive agent supplying passages 68 for supplying the adhesive agent to the adhesive agent accumulation portion 62. A flexible adhesive agent supplying tube 70 is connected to each adhesive agent supplying passage 68. The adhesive agent supplying tube 70 is connected to the adhesive agent supplying apparatus 72. The adhesive agent supplying apparatus 72 pressurizes the adhesive agent to a predetermined pressure, measures the pressurized adhesive agent, and supplies the pressurized adhesive agent to the adhesive agent accumulation portion 62 with a predetermined flow rate via the adhesive agent supplying tubes 70 and the adhesive agent supplying passages 68. Thereby, the adhesive agent is constantly supplied to the discharge holes 64 from the adhesive agent accumulation portion 62 with a predetermined pressure.

Note that, in this embodiment, two adhesive agent supplying tubes 70 and two adhesive agent supplying passages 68 are provided and the adhesive agent is supplied to two sections of the adhesive agent accumulation portion 62 that are 180 degrees apart from each other in the circumferential direction, but this configuration is not essential. The number and the supplying positions only need to be a number and supplying positions that are necessary in order to ensure the supply amount of the adhesive agent for maintaining the pressure of the adhesive agent in the entire area of the adhesive agent accumulation portion 62 at an appropriate pressure. The appropriate pressure of the adhesive agent is determined in accordance with the size and the number of the discharge holes 64, the arrangement of the discharge holes 64, and the like.

The adhesive agent in the adhesive agent accumulation portion 62 is discharged from the discharge holes 64 to a place above the application table 60. Since the pressure of the adhesive agent in the adhesive agent accumulation portion 62 is maintained at a predetermined value and the adhesive agent has a predetermined viscosity, the adhesive agent discharged to the outside from the discharge holes 64 constantly forms a bulging portion N that is bulging above the upper surface 61 of the upper block 58 in a substantially hemispherical shape as illustrated in FIG. 7. The height of the bulging portion N is slightly larger than the level difference α. Therefore, when the application table 60 is in the raised position (transfer position) and the strip F descends to a position in which the lower surface of the strip F comes into contact with the upper surface 47 of the die plate 40, the bulging portion N of the adhesive agent of each of the discharge holes 64 comes into contact with the lower surface of the strip F, and the adhesive agent is transferred to the application points E in a round dot shape.

If the adhesive agent applying apparatus 50 intermittently forms the bulging portions N, the timing is set so that the bulging portions N are formed when the strip F is placed in a position where the lower surface of the strip F is in contact with the upper surface 47 of the die plate 40. As a result, the adhesive agent is transferred to the application points E in a round dot shape in a state in which the lower surface of the strip F is in contact with the upper surface 47 of the die plate 40.

The transfer amount of the adhesive agent on the application points E can be controlled in accordance with the level difference α and the size (volume) of the bulging portion N. The size of the bulging portion N is quantitatively determined in accordance with the pressure of the adhesive agent in the adhesive agent accumulation portion 62, the viscosity of the adhesive agent, the inner diameter of the discharge holes 64, and the like, and hence the transfer amount of the adhesive agent on the application points E can be set to an optimal value by optimally setting those factors.

In the transfer-type application of the adhesive agent using the discharge holes 64 as above, the minimum pitch between the application points E can be set to a size that is slightly larger than the inner diameter of the discharge holes 64 by reducing the pitch between the adjacent discharge holes 64. As a result, even when the teeth portion C is small, the application points E can be set in a plurality of sections in the teeth portion C. This contributes to the enhancement of the bond strength of the teeth portion C in the lamination bonding of the plurality of iron core laminae W.

When the application table 60 is in the lowered position (non-transfer position), the upper surface 61 of the upper block 58 is placed below the upper surface 47 of the die plate 40 by a large level difference that is larger than the level difference α. As a result, the bulging portion N of the adhesive agent having a defined size does not come into contact with the lower surface of the strip F, and the adhesive agent is not transferred to the lower surface of the strip F. Therefore, the application table 60 only needs to be moved to the lowered position when forming an iron core lamina for separation to set the number of the iron core laminae W to be stacked.

Figure 8A:
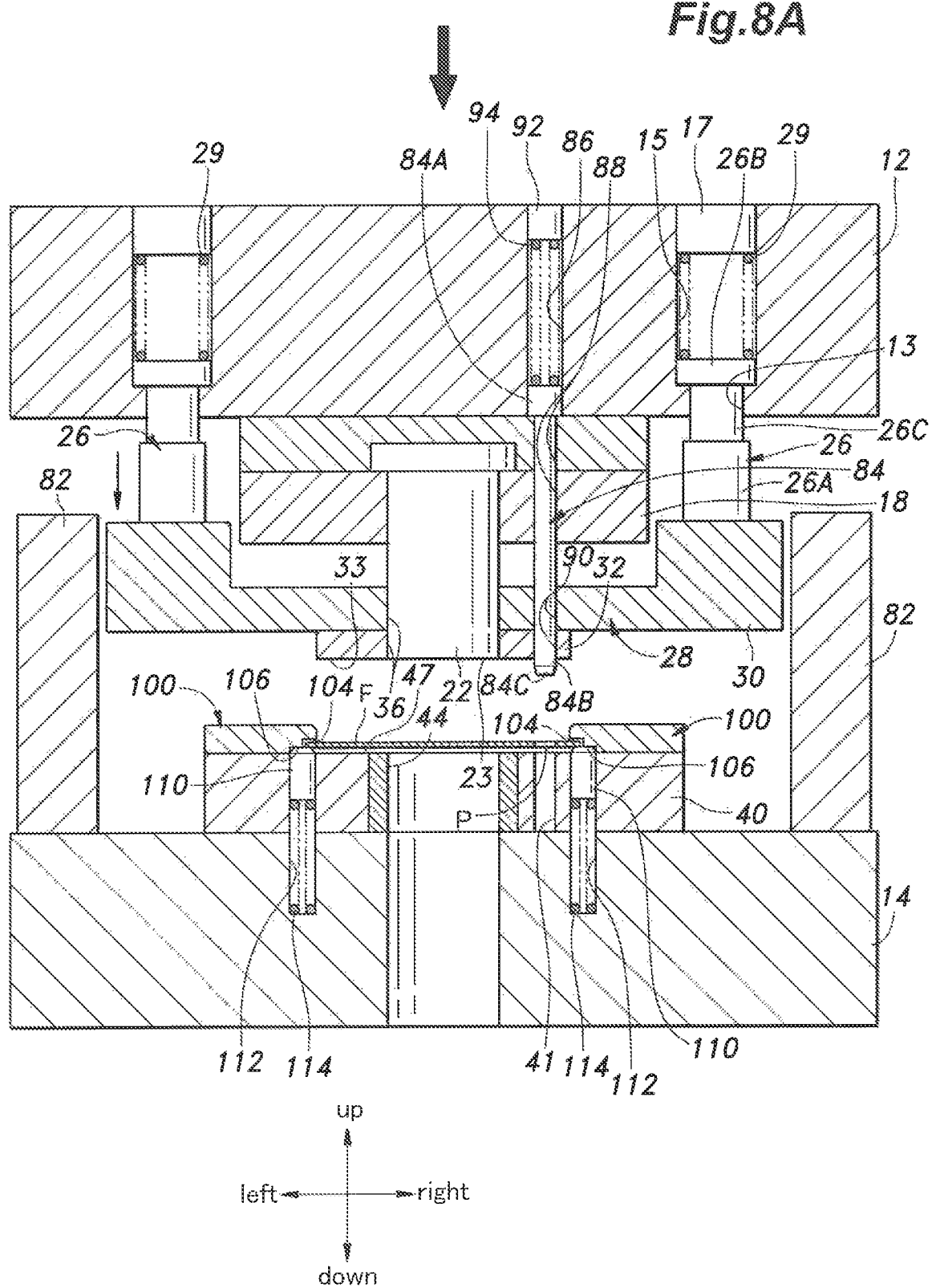
FIG. 8A is a cross-sectional view of an inner shape punching station of the manufacturing apparatus according to this embodiment in a top dead center state.
Figure 8B:
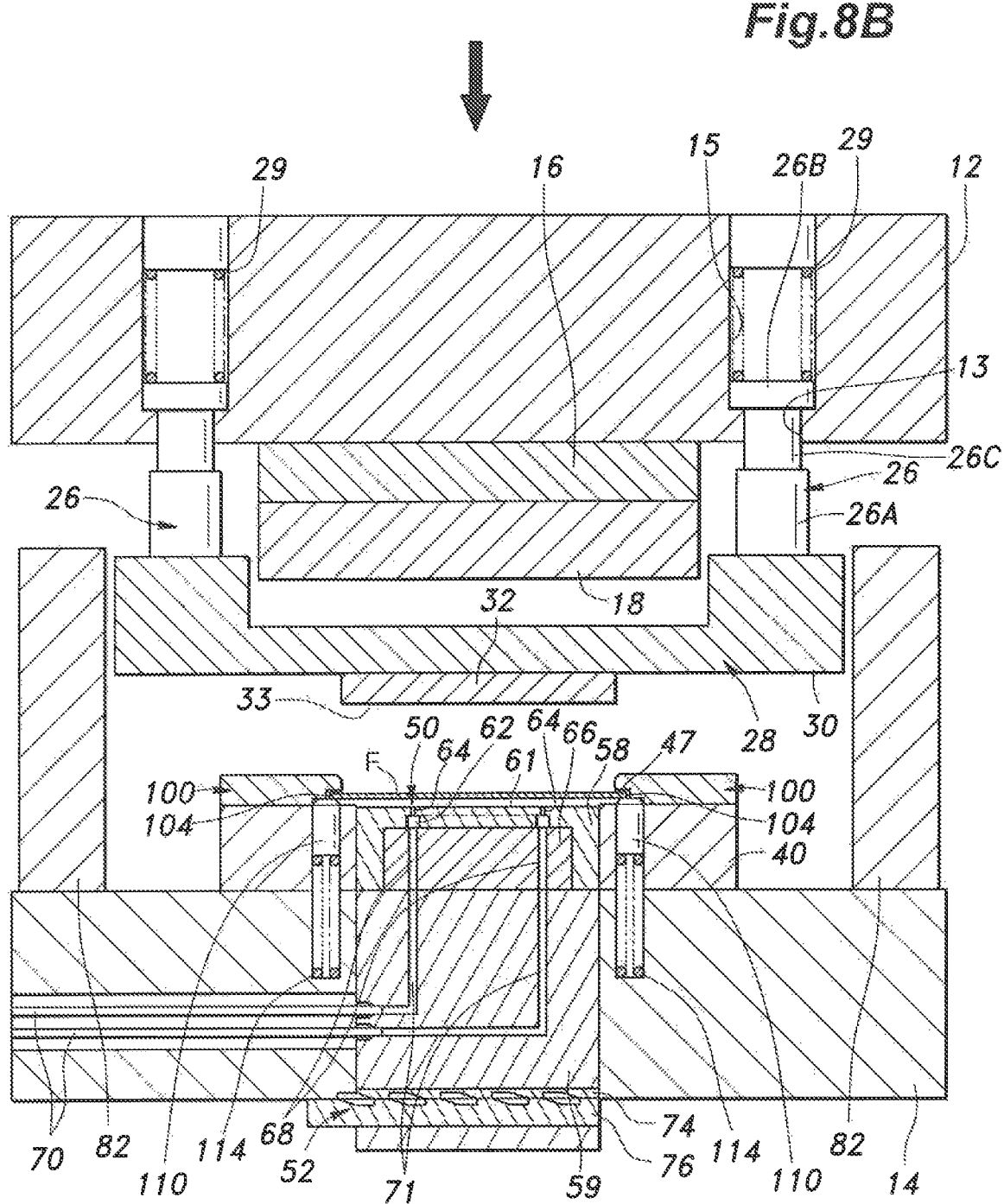
FIG. 8B is a cross-sectional view of an adhesive agent applying station of the manufacturing apparatus according to this embodiment in the top dead center state.

As illustrated in FIG. 8A and FIG. 8B, knock-outs 26 are attached to the upper holder 12. Note that FIG. 8A illustrates the inner shape punching station II as a representative example of the punching stations, and FIG. 8B illustrates the adhesive agent applying station IV.

Each knock-out 26 includes a lower end 26A in abutment with the upper portion of the stripper main body 30, a shaft portion 26C fitted in a through hole 13 formed in the upper holder 12 in a vertically movable manner, and an upper end flange 26B located in a spring chamber 15 formed in the upper holder 12. The upper portion of the spring chamber 15 is closed by a plug 17 fixed to the upper holder 12. A stripper spring 29 (a knock-out spring) consisting of a compression coil spring is provided between the plug 17 and the upper end flange 26B. The stripper spring 29 biases the knock-out 26 downward.

Figure 12A:
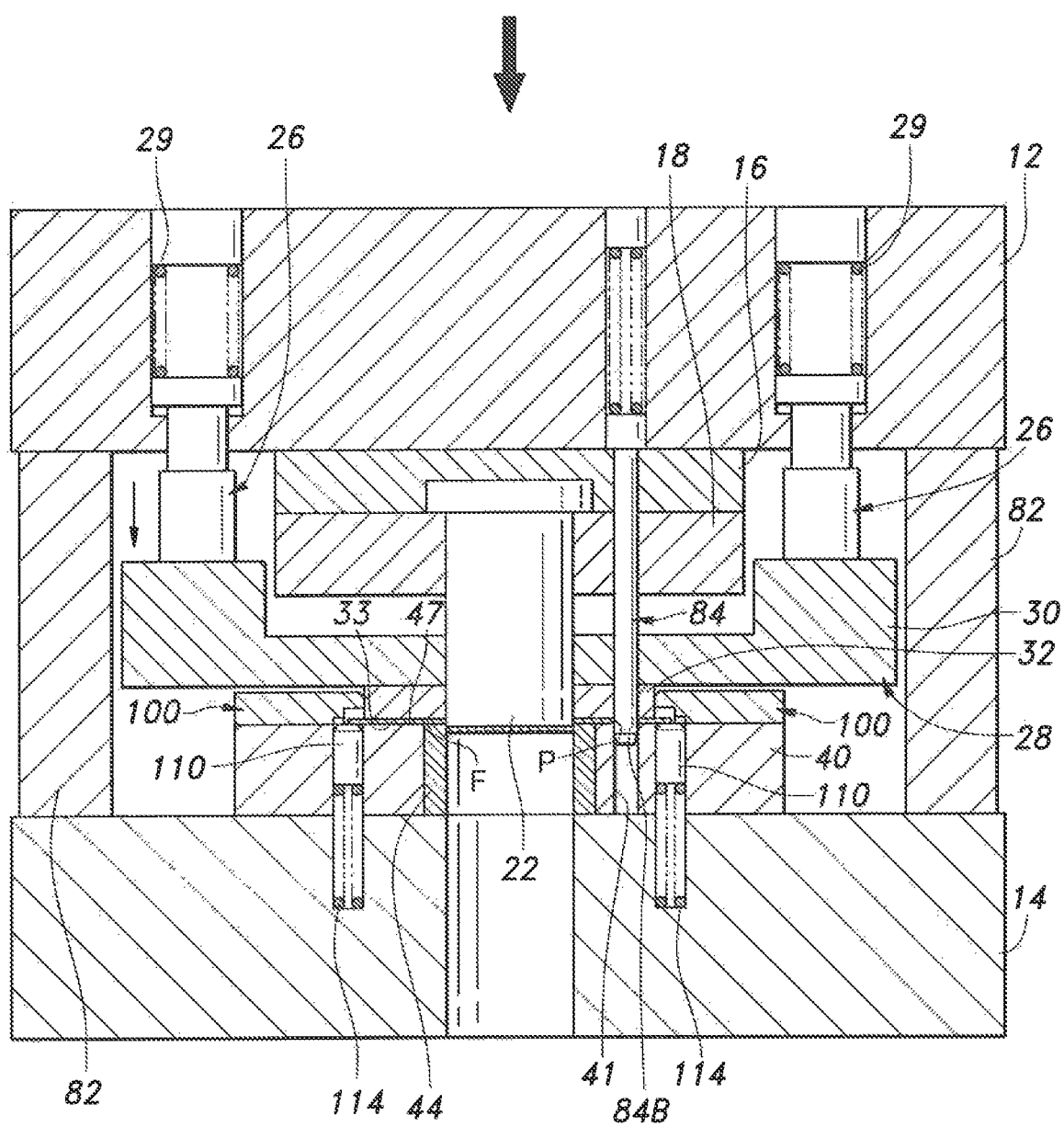
FIG. 12A is a cross-sectional view of the inner shape punching station of the manufacturing apparatus according to this embodiment in a bottom dead center state.
Figure 12B:
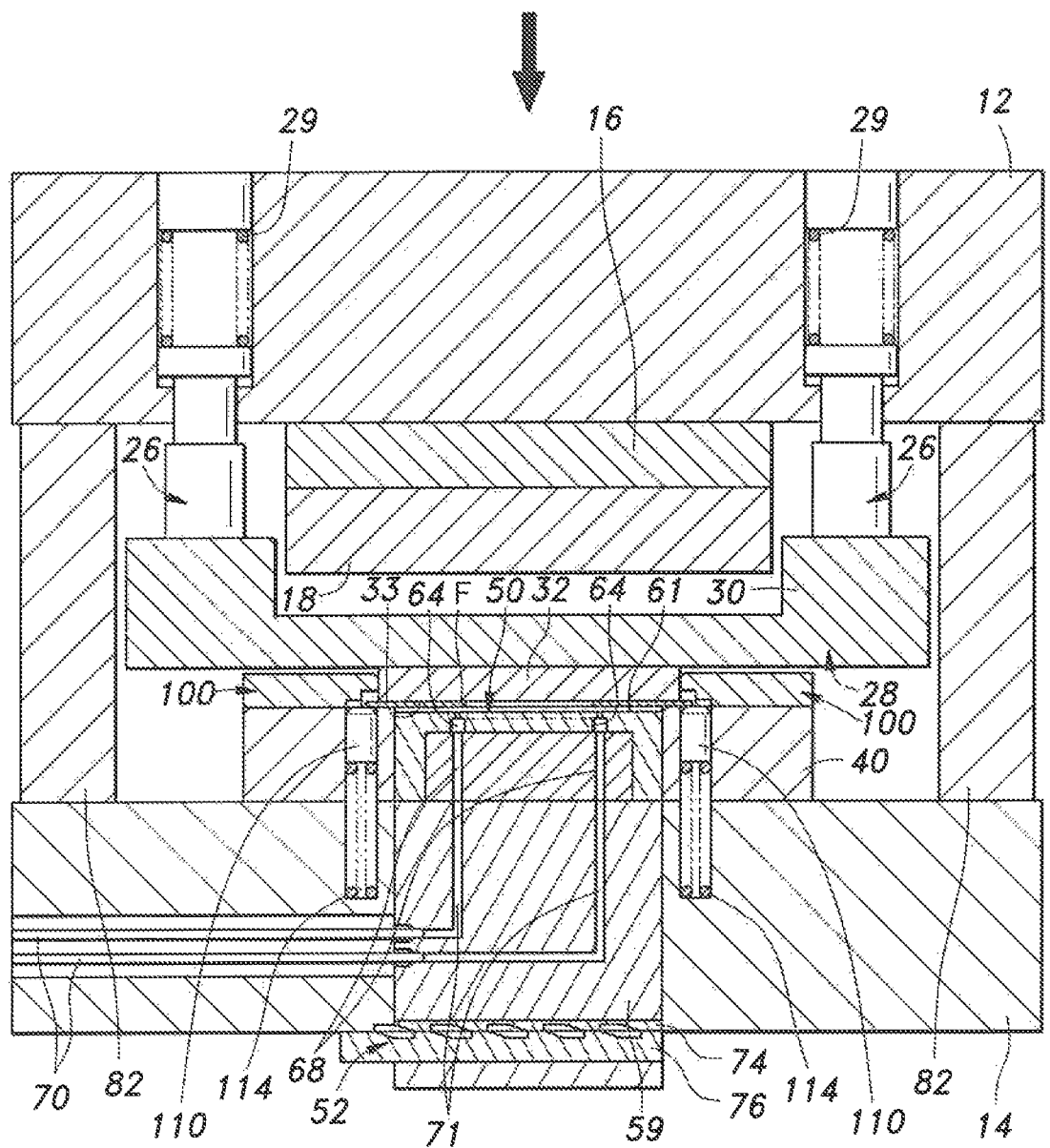
FIG. 12B is a cross-sectional view of the adhesive agent applying station of the manufacturing apparatus according to this embodiment in the bottom dead center state.

As illustrated in FIG. 12A and FIG. 12B, the most lowered position (bottom dead center position) of the upper holder 12 is determined by abutment of the lower surface of the upper holder 12 against the upper surface of stoppers 82 provided on both of right and left sides of the lower holder 14 at the bottom dead center of the upper ram (not shown) of the press machine. When the upper holder 12 is placed in the most lowered position, the stripper plate 32 comes into abutment with the strip F and presses the strip F against the upper surface 47 of the die plate 40 while being displaced with respect to the upper holder 12 to cause the compressive deformation of the stripper springs 29.

A relative displacement stroke of the stripper 28 with respect to the upper holder 12 in the vertical direction is larger than the entering stroke of the punches 20, 22, and 24 with respect to the dies 42, 44, and 46. As illustrated in FIG. 12A, the entering stroke is a stroke corresponding to the entering amount by which the punches 20, 22, and 24 enter the dies 42, 44, and 46 in a state in which the upper holder 12 is in the most lowered position.

That is, the stripper 28 including the stripper plate 32 is formed so that the stroke between the most lowered position of the stripper 23 with respect to the upper holder 12 and the position in which the stripper 28 presses the strip F against the upper surface 47 of the die plate 40 of the lower holder 14 after moving relative to the upper holder 12 to cause the elastic deformation of the stripper spring 29 is larger than the maximum entering stroke by which the punches 20, 22, and 24 enter the dies 42, 44, and 46.

Owing to this stroke setting, in the ascending process of the upper holder 12 after the punching, the punches 20, 22, and 24 are pulled out from the dies 42, 44, and 46 and the strip F, and thereafter, the stripper 28 ascends together with the upper holder 12 and the pressing of the strip F by the stripper 28 is released. As a result, the state in which the strip F is pressed against the upper surface 47 of the die plate 40 by the stripper 28 is maintained until the punches 20, 22, and 24 come out of the dies 42, 44, and 46.

As illustrated in FIG. 8A, in the stations II to VII other than the pilot hole punching station I, a pilot pin 84 capable of entering a pilot hole P in the strip F is provided in each of the stations II to VII. Note that the illustration of the pilot pin 84 provided in the adhesive agent applying station IV is omitted in FIG. 8B.

Each of the pilot pins 84 includes an upper end flange 84A, a straight shaft portion 84B, and a lower end tapered shaft portion 84C in sequence in the axial direction. Each of the pilot pins 84 is inserted in a mounting hole 86 formed in the upper holder 12, and vertically passes through a through hole 88 formed in the back plate 16 and the punch plate 18 and a through hole 90 formed in the stripper 28 in a slidable manner. The lower end tapered shaft portion 84C as well as a lower part of the straight shaft portion 84B protrude downward from the lower surface 33 of the stripper plate 32 in the most lowered position with respect to the upper holder.

Owing to the above setting, in the descending process of the upper holder 12, the straight shaft portions 84B of the pilot pins 84 enter the corresponding pilot holes P before the lower surface 33 of the stripper plate 32 comes into abutment with the strip F, whereby positioning of the strip F is performed in the progressive direction as well as in a direction orthogonal to the progressive direction on the upper surface 47 of the die plate 40, that is, in the right and left directions.

The most lowered position (lower limit position) of each of the pilot pins 84 is set by abutment of the lower surface of the upper end flange 84A against the upper surface of the back plate 16 forming a bottom surface of the mounting hole 86. Each of the pilot pins 84 is biased downward by the spring force of the compression coil spring 94 provided between a plug 92, which is fixed to the upper holder 12 to close the upper portion of the mounting hole 86, and the upper end flange 84A. The spring-biased structure is a relief structure for avoiding damage to the pilot pin 84 when the pilot pin 84 does not correctly enter the pilot hole P. Note that the die plate 40 is provided with pin relief holes 41 in which the pilot pins 84 enter.

Next, a feed guide structure and a lift up structure of the strip F are described with reference to FIG. 4, FIG. 8A, and FIG. 8B. On the lower holder 14, that is, on the die plate 40 fixed to the lower holder 14 in the illustrated embodiment, right and left guiding members 100 that guide the conveyance of the strip F, which is a thin steel sheet, in a direction along the direction in which the strip F is conveyed in an intermittent manner (progressive direction) are symmetrically attached. The right and left guiding members 100 each have a strip-like shape that is long in the progressive direction of the strip F, and, as illustrated in FIG. 4, are provided at intervals in the progressive direction of the strip F except for regions corresponding to the stations II, IV, and VI.

Figure 16:
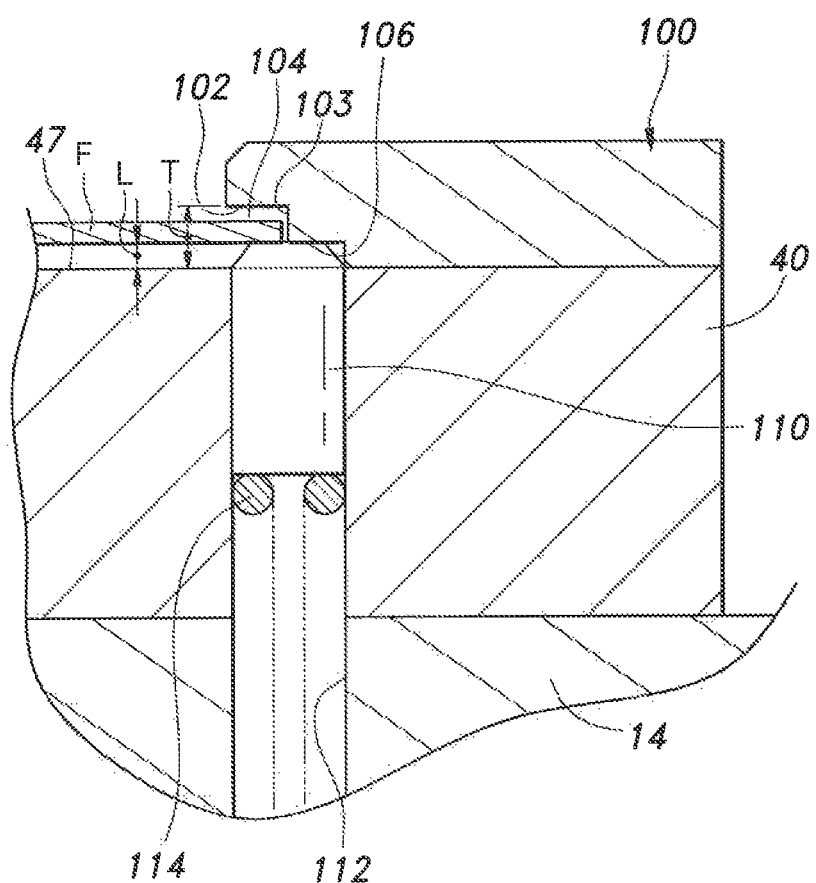
FIG. 16 is an enlarged cross-sectional view of a lift-up portion of the manufacturing apparatus according to this embodiment in the top dead center state.
Figure 17:
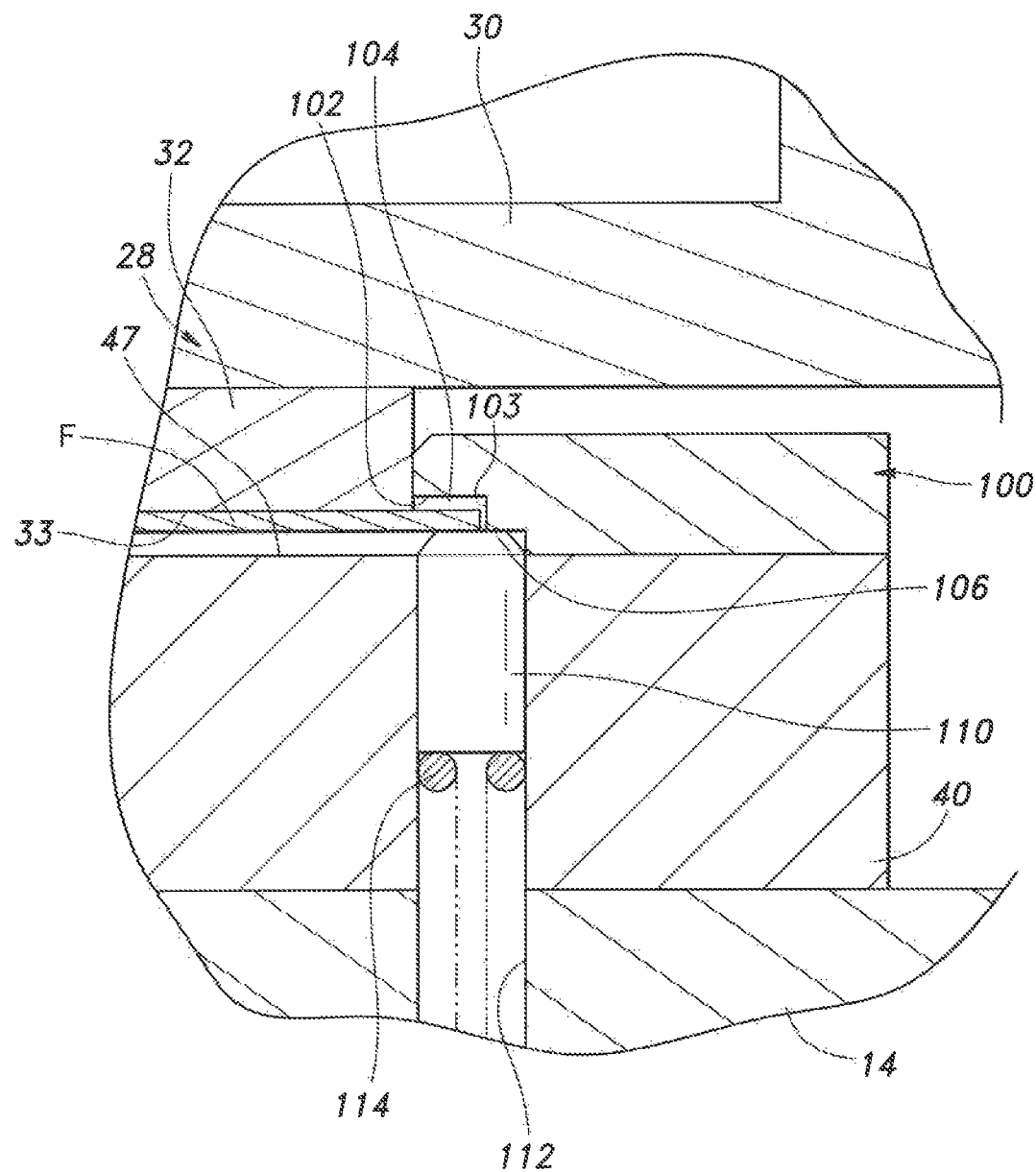
FIG. 17 is an enlarged cross-sectional view of the lift-up portion of the manufacturing apparatus according to this embodiment in the descending process 2.

As illustrated in FIG. 16, the right and left guiding members 100 each have a lower surface 102 formed by a horizontal wall opposing the upper surface 47 of the die plate 40 from above with a predetermined distance T therebetween, and a side surface 103 formed by a vertical wall opposing the right or left end surface of the strip F with a predetermined gap therebetween, such that the side portions of the right and left guiding members 100 opposed to each other have a hook-like cross-sectional shape. The lower surfaces 102 and the side surfaces 103 of the guiding members 100, and the upper surface 47 of the die plate 40 cooperate with each other to define right and left guide grooves 104 extending in the progressive direction of the strip F and having a rectangular cross-sectional shape with an inward facing opening.

The right and left side edge portions of the strip F enter the right and left guide grooves 104, respectively. As a result, the guiding members 100 guide the intermittent conveyance of the strip F by limiting the movement of the strip F in the right and left directions with the side surfaces 103 and limiting the upward movement of the strip F with the lower surfaces 102.

Consequently, the shifting of the strip F in the right and left directions and the vertical direction is suppressed when the strip F is conveyed in an intermittent manner, and the movement of the strip F in the right and left directions and in the upward direction with respect to the upper surface 47 of the die plate 40 is limited when the adhesive agent is applied to the adhesive agent applying surface (lower surface) of the strip F. As a result, the adhesive agent is accurately applied on the adhesive agent applying surface. Note that, by being placed on the upper surface 47 of the die plate 40 or by being lifted up by lifter pins 110 described below, the downward movement of the strip F is limited (prevented).

The abovementioned predetermined distance T is larger than the total of a lift up amount L of the strip F by the lifter pins 110 described below and the thickness of the strip F. With this setting, even when the strip F is lifted up by the lifter pins 110, the strip F does not come into abutment with the lower surfaces 102 of the guiding members 100. As a result, the upper surface of the strip F does not come into sliding contact with the lower surfaces 102 of the guiding members 100 when the strip F is conveyed in an intermittent manner, and the guiding members 100 do not increase the frictional resistance when the strip F is conveyed in an intermittent manner.

As illustrated in FIG. 4, the lifter pins 110 are provided on both of right and left sides of the die plate 40 with a predetermined interval in the progressive direction of the strip F. The arrangement positions of the lifter pins 110 overlap with the arrangement positions of the guiding members 100 in plan view.

As illustrated in FIG. 8A and FIG. 8B, the lifter pins 110 are provided in lifter pin holes 112 so as to be displaceable in the vertical direction. The lifter pin holes 112 are formed in the die plate 40 and the lower holder 14 so as to open in the upper surface 47 of the die plate 40. The upper end side of each lifter pin 110 is exposed on the upper surface 47 of the die plate 40. Lifter springs 114 each consisting of a compression coil spring are provided between the lifter pins 110 and the bottom portions of the lifter pin holes 112. The lifter springs 114 bias the corresponding lifter pins 110 upward.

Figure 11A:
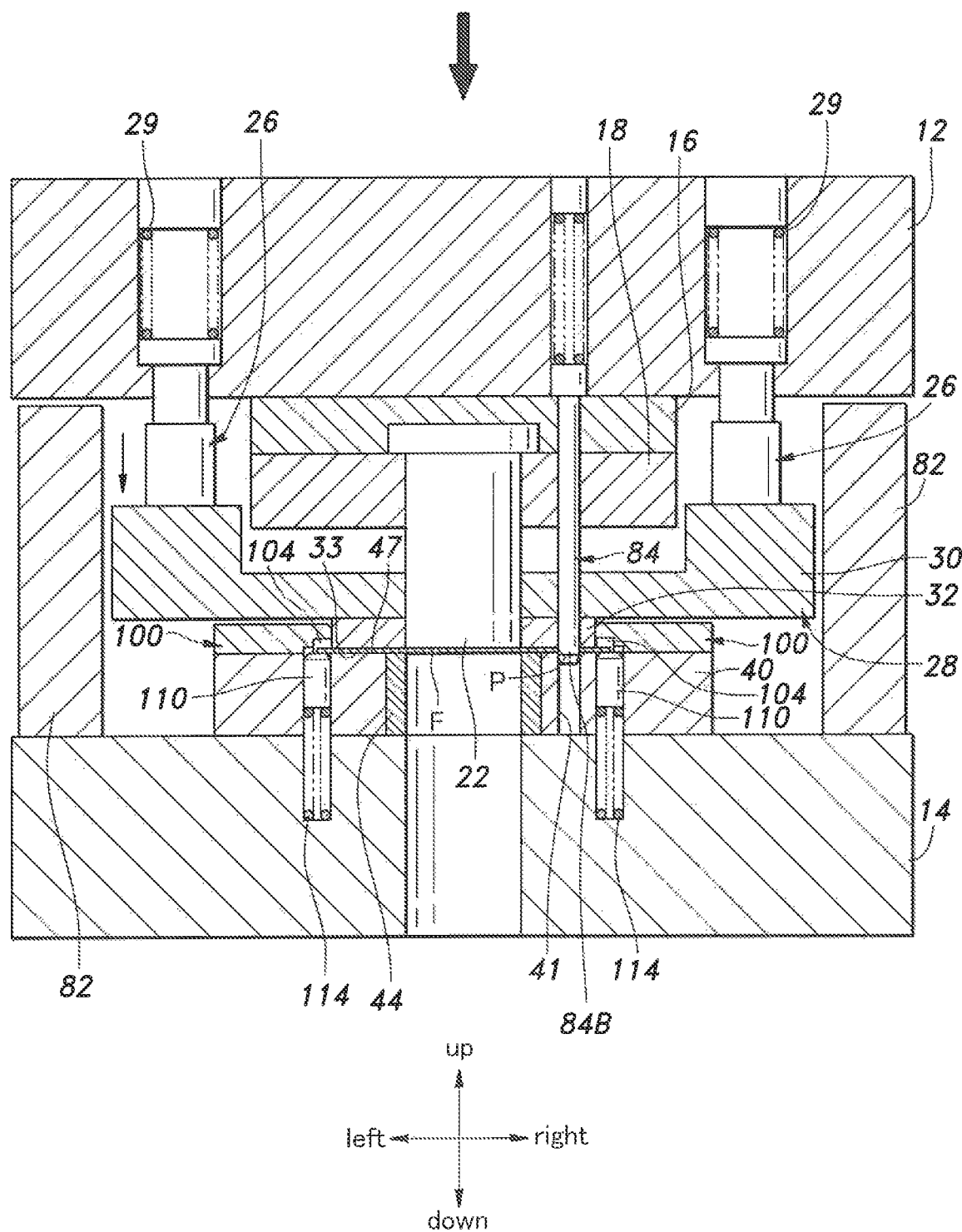
FIG. 11A is a cross-sectional view of the inner shape punching station of the manufacturing apparatus according to this embodiment in a descending process 3.
Figure 11B:
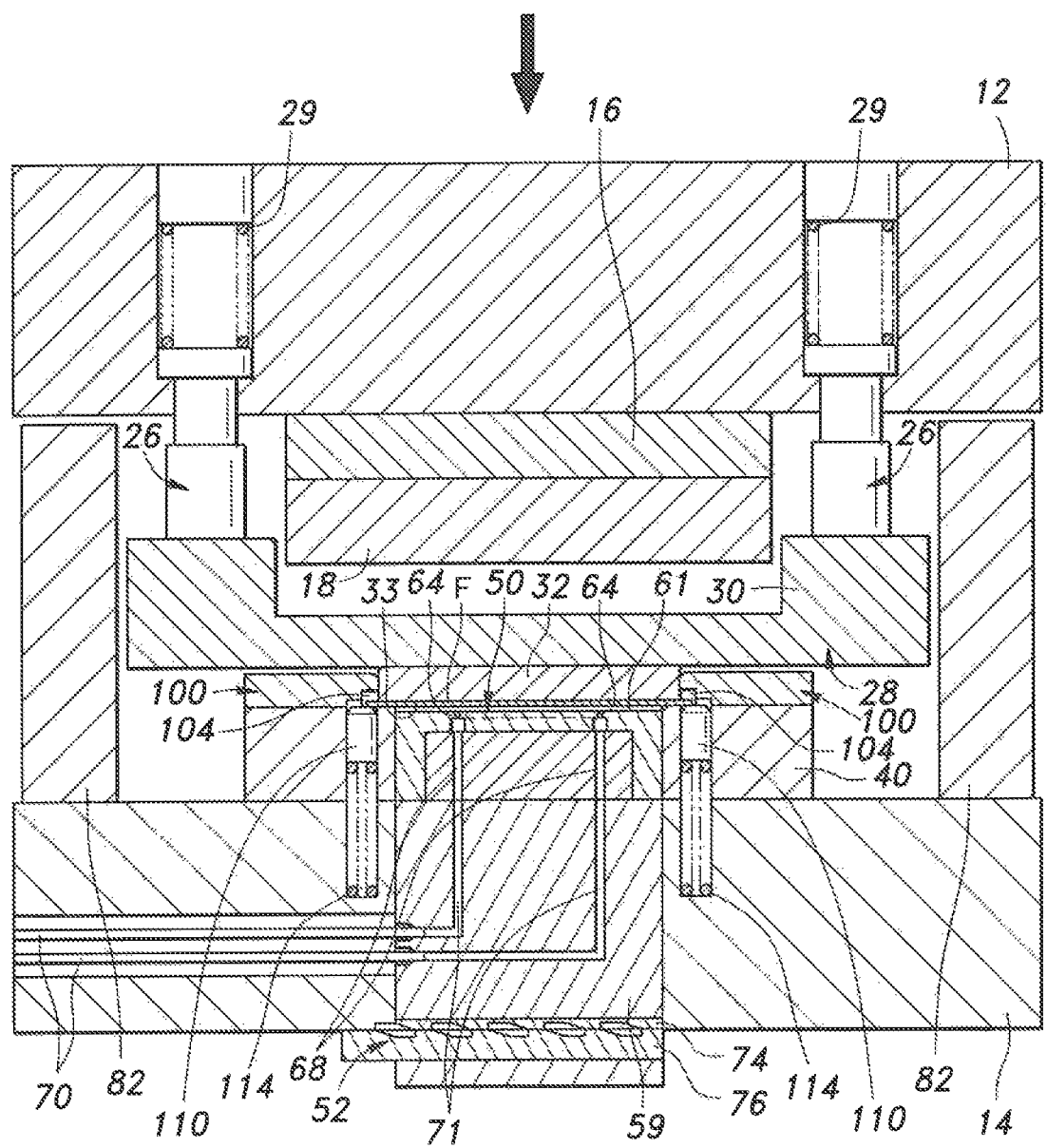
FIG. 11B is a cross-sectional view of the adhesive agent applying station of the manufacturing apparatus according to this embodiment in the descending process 3.

About half of the upper end surface of each of the lifter pins 110 can come into abutment with the lower surface of the strip F, and the remaining half can come into abutment with a stopper surface 106 formed on each of the guiding members 100. As a result, as illustrated in FIG. 8A, FIG. 8B, and FIG. 16, when the strip F is not pressed down by the stripper 28, the lifter pins 110 are placed in the raised position in which the upper end surfaces are in abutment with the stopper surface 106 by the spring bias of the lifter springs 114, and raise (lift up) the strip F from the upper surface 47 of the die plate 40. When the strip F is pressed down by the stripper 28, as illustrated in FIG. 11A, FIG. 11B, and FIG. 18, the lifter pins 110 are lowered by the strip F against the spring force of the lifter springs 114, and entirely sink into the lifter pin holes 112.

As illustrated in FIG. 16, the lift up amount L of the strip F by the lifter pins 110 is determined by abutment of the upper surfaces of the lifter pins 110 against the stopper surfaces 106 of the guiding members 100 facing downward, and the lift up amount L is set to a value that is larger than the applying thickness (maximum thickness) of the adhesive agent transferred to the lower surface of the strip F.

Next, with reference to FIG. 8A, FIG. 8B to FIG. 15A, FIG. 15B, and FIG. 16 to FIG. 19, the operation of the manufacturing apparatus 10 by the abovementioned configuration is described. Note that FIG. 8A to FIG. 15A illustrate the operation of the inner shape punching station II as a representative example of the punching stations, and FIG. 8B to FIG. 15B illustrate the operation of the adhesive agent applying station IV. The operation of the pilot hole punching station I and the outer shape punching station VI is substantially the same as the operation of the inner shape punching station II, and hence the description of the operation is omitted.

FIG. 8A and FIG. 8B illustrate, as a press starting state, a state in which the upper ram (not shown) of the press machine is at the top dead center and the upper holder 12 is at the most raised position (top dead center position). In this press starting state, the punch 22 for inner shape punching, the stripper 28, and the pilot pin 84 are in a position separated from the die plate 40 in the upward direction. The strip F is in a raised position (lift up state) where the strip F is separated from the upper surface 47 of the die plate 40 by the lifter pins 110 (see FIG. 16). In the lift up state, the strip F is conveyed by an intermittent feed apparatus (not shown) in an intermittent manner (by a predetermined amount for each intermittent conveyance) in the progressive direction without the lower surface of the strip F coming into sliding contact with the upper surface 47 of the die plate 40.

Figure 9A:
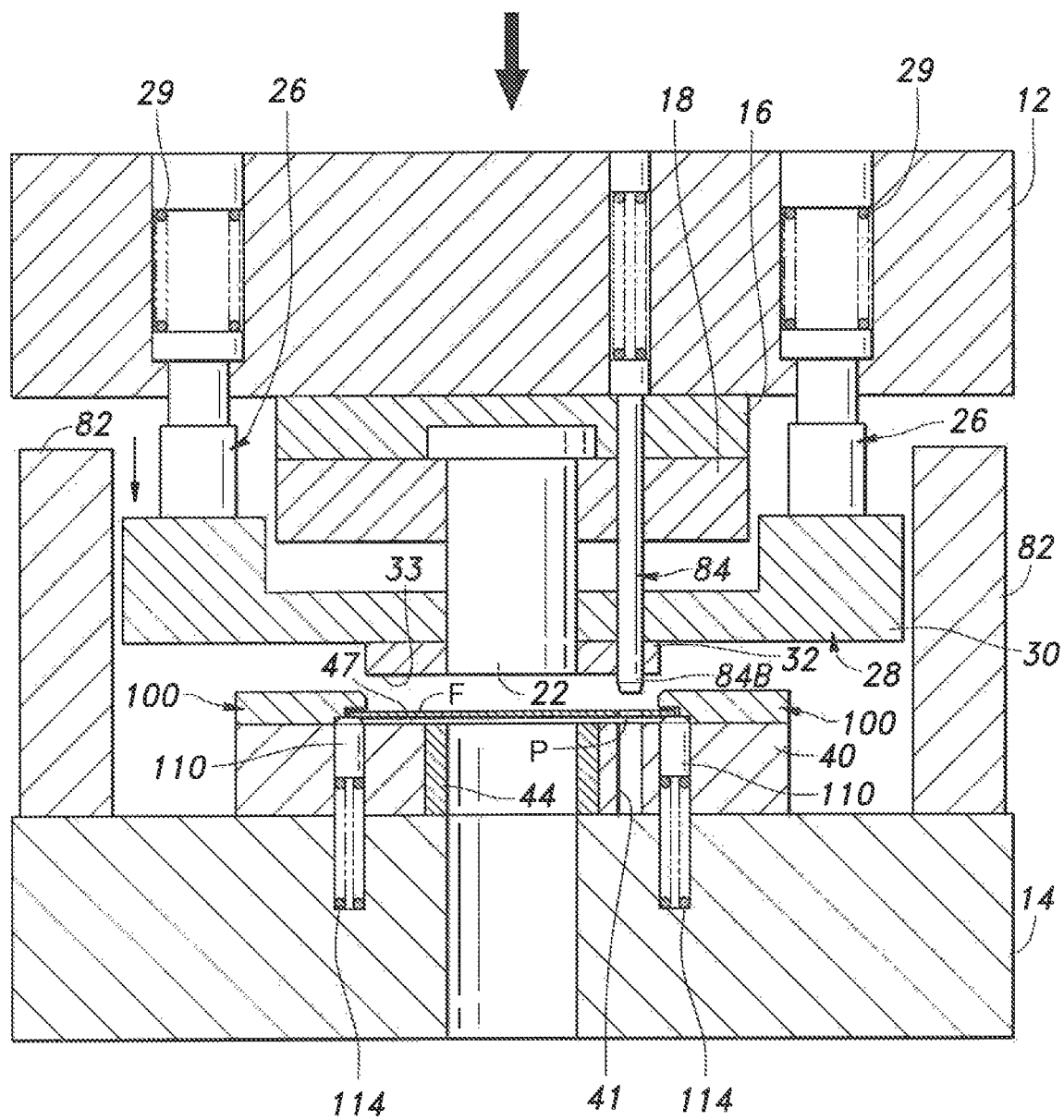
FIG. 9A is a cross-sectional view of the inner shape punching station of the manufacturing apparatus according to this embodiment in a descending process 1.
Figure 10A:
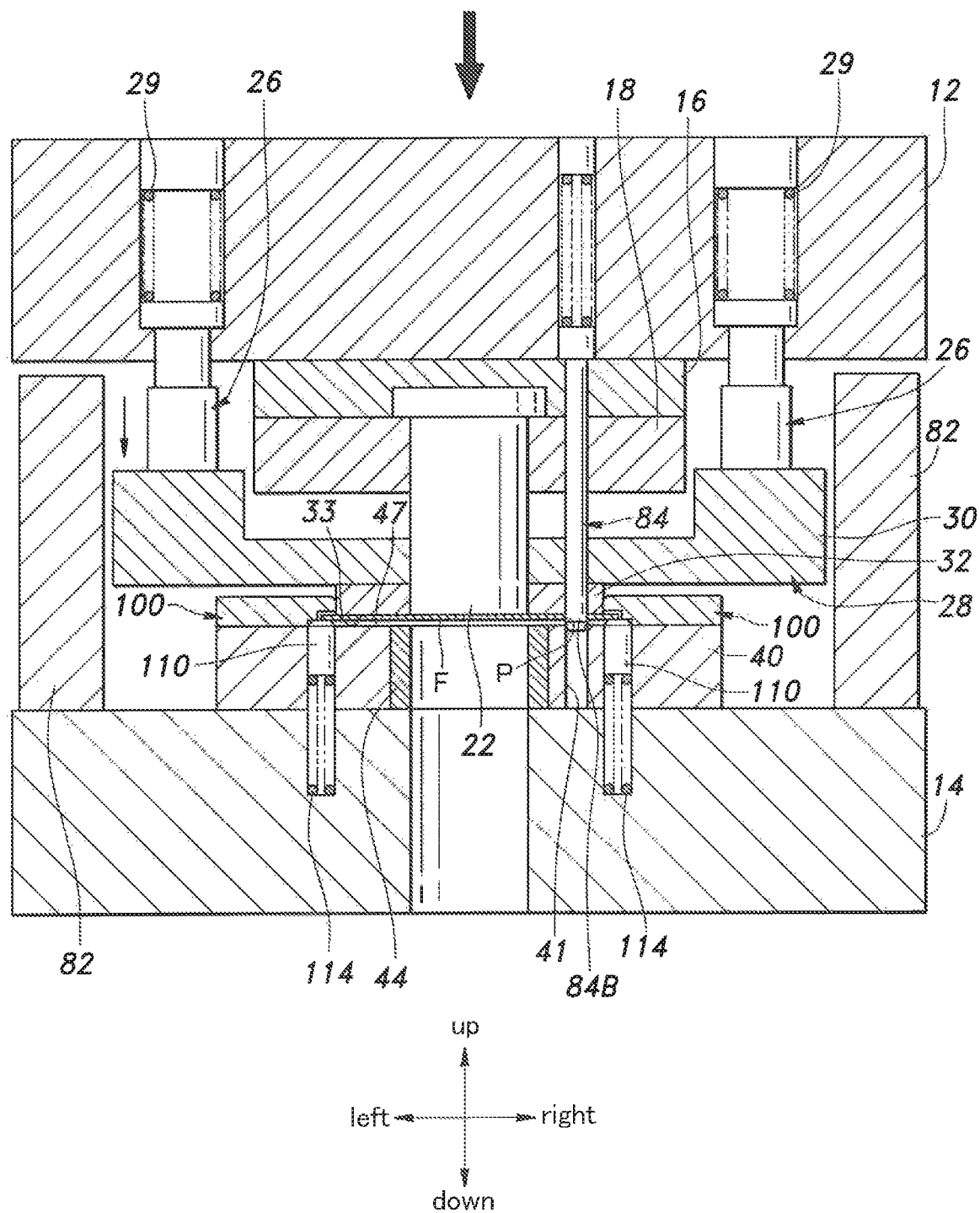
FIG. 10A is a cross-sectional view of the inner shape punching station of the manufacturing apparatus according to this embodiment in a descending process 2.
Figure 10B:
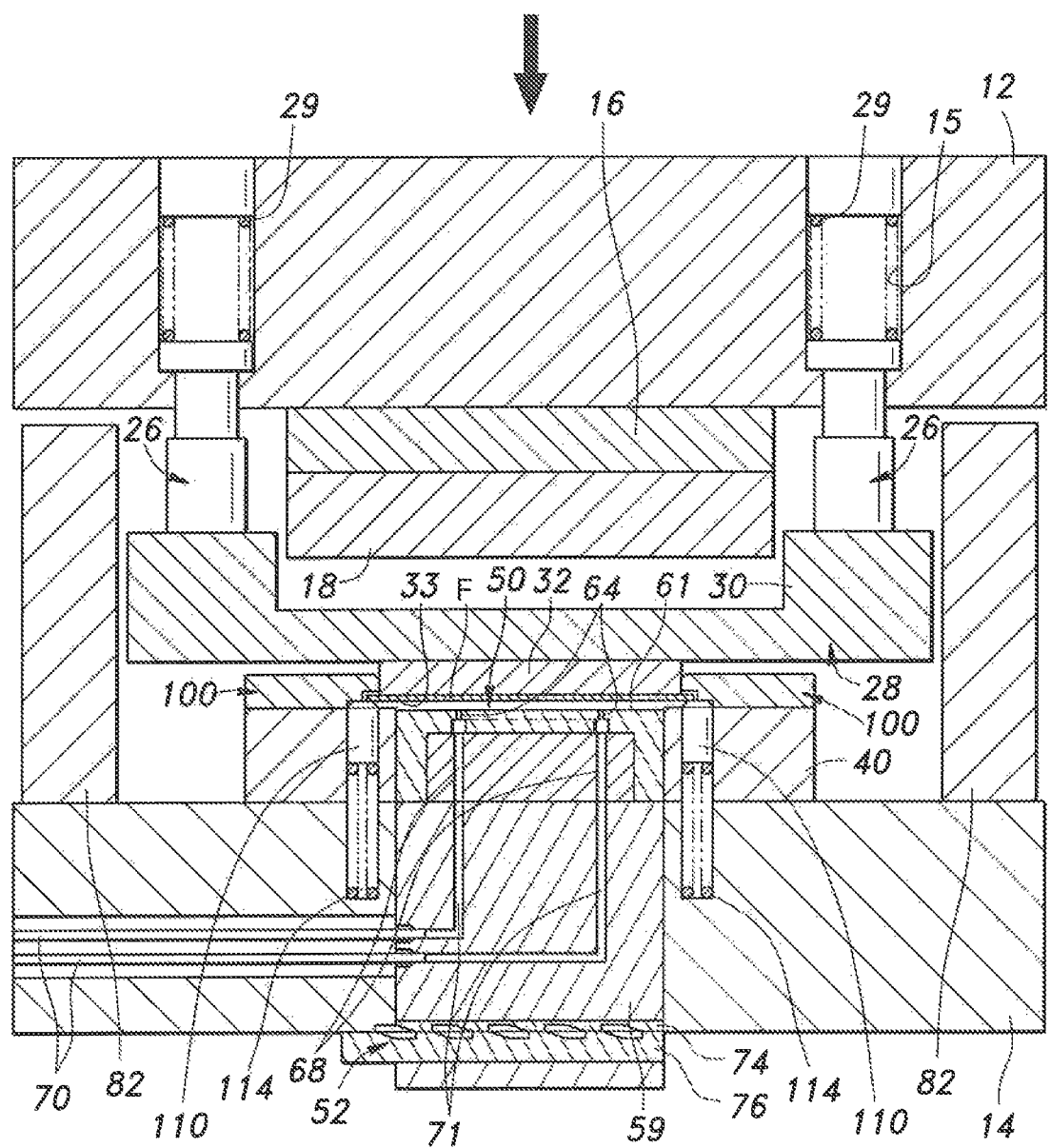
FIG. 10B is a cross-sectional view of the adhesive agent applying station of the manufacturing apparatus according to this embodiment in the descending process 2.

Upon completion of one intermittent conveyance or during an intermittent conveyance process, the upper holder 12 starts to descend from the top dead center position, as illustrated in FIG. 9A and FIG. 9B. As the descent of the upper holder 12 proceeds, the straight shaft portion 84B enters the pilot hole P in the strip F following the lower end tapered shaft portion 84C of the pilot pin 84 before the stripper 28 presses the strip F against the upper surface 47 of the die plate 40, as illustrated in FIG. 10A and FIG. 10B. As a result, the positioning of the strip F with respect to the manufacturing apparatus 10 in the conveyance direction (progressive direction) and in the right and left directions is performed.

The positioning is performed in a state in which the strip F is lifted up from the upper surface 47 of the die plate 40, and hence the movement of the strip F in the conveyance direction and the right and left directions for positioning with respect to the manufacturing apparatus 10 is performed with low frictional resistance.

As illustrated in FIG. 11A and FIG. 11B, as the descent of the upper holder 12 further proceeds, the lower surface 33 of the stripper plate 32 comes into abutment with the upper surface of the strip F (see FIG. 17), and the stripper 28 pushes the strip F together with the lifter pins 110 down to a position in which the strip F is in abutment with the upper surface 47 of the die plate 40 against the spring force of the lifter springs 114 (see FIG. 18). Note that, at this time, owing to the overall setting of the spring force of the stripper springs 29 and the lifter springs 114, the stripper springs 29 do not compressively deform, and the stripper 28 is maintained to be in the most lowered position with respect to the upper holder 12.

As illustrated in FIG. 12A and FIG. 12B, as the descent of the upper holder 12 further proceeds, the stripper springs 29 compressively deform, the upper holder 12 descend with respect to the stripper 28, and the lower surface of the upper holder 12 is placed at the bottom dead center to be in abutment with the upper surface of the stopper 82. As a result, as illustrated in FIG. 12A, in the inner shape punching station II, the punch 22 for inner shape punching enters the die 44 for inner shape punching while the strip F is in a clamped state in which the strip F is pressed against the upper surface 47 of the die plate 40 by the stripper 28 biased by the springs, and the punching of the inner shape IS is performed. In addition, in the adhesive agent applying station IV, when the strip F is pressed against the upper surface 47 of the die plate 40 by the stripper 28 biased by the springs, the bulging portions N of the adhesive agent discharged from the discharge holes 64 are transferred to the corresponding application points E on the lower surface of the strip F (see FIG. 7).

The transfer of the adhesive agent is performed in a state in which the movement of the strip F in the right and left directions is limited and the upward movement of the strip F is limited by the guiding members 100, and the positioning of the strip F is performed by the pilot pin 84. Therefore, even in a case where the application points E are small, the adhesive agent is accurately transferred to the application points E with high position accuracy.

In addition, the transfer of the adhesive agent is performed in a state in which the lower surface of the strip F is pressed against the upper surface 47 of the die plate 40 and thus the strip F cannot vibrate. Therefore, even when the punching of the inner shape IS and the transfer of the adhesive agent are simultaneously performed, the transfer of the adhesive agent can be performed without the vibrations of the hoop material F caused by the punching shock in the inner shape punching station II, and the adhesive agent is accurately transferred to the application points E. This also contributes to allowing the adhesive agent to be accurately transferred to the application points E with high position accuracy even when the application points E are small.

Figure 13A:
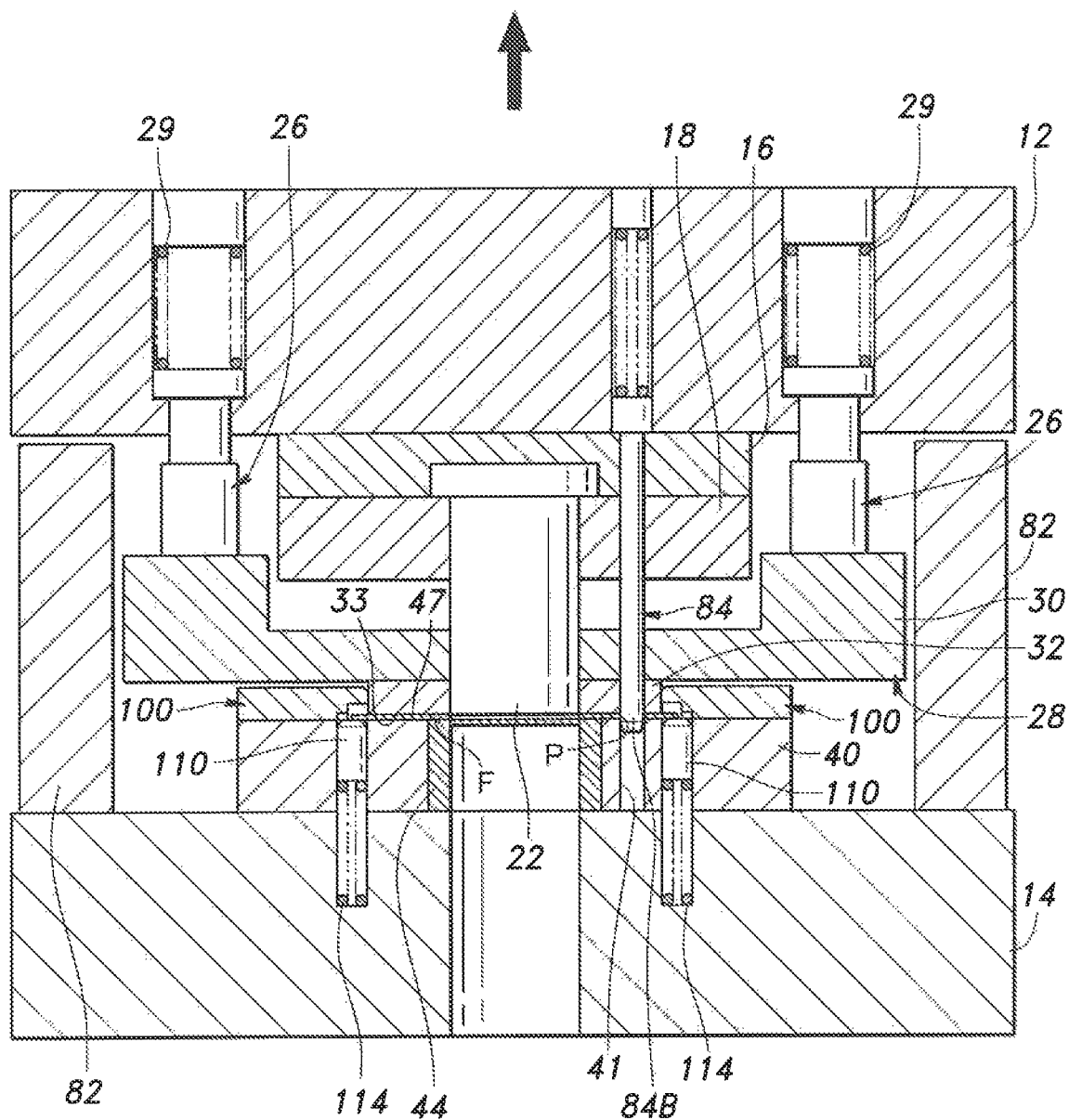
FIG. 13A is a cross-sectional view of the inner shape punching station of the manufacturing apparatus according to this embodiment in an ascending process 1.
Figure 13B:
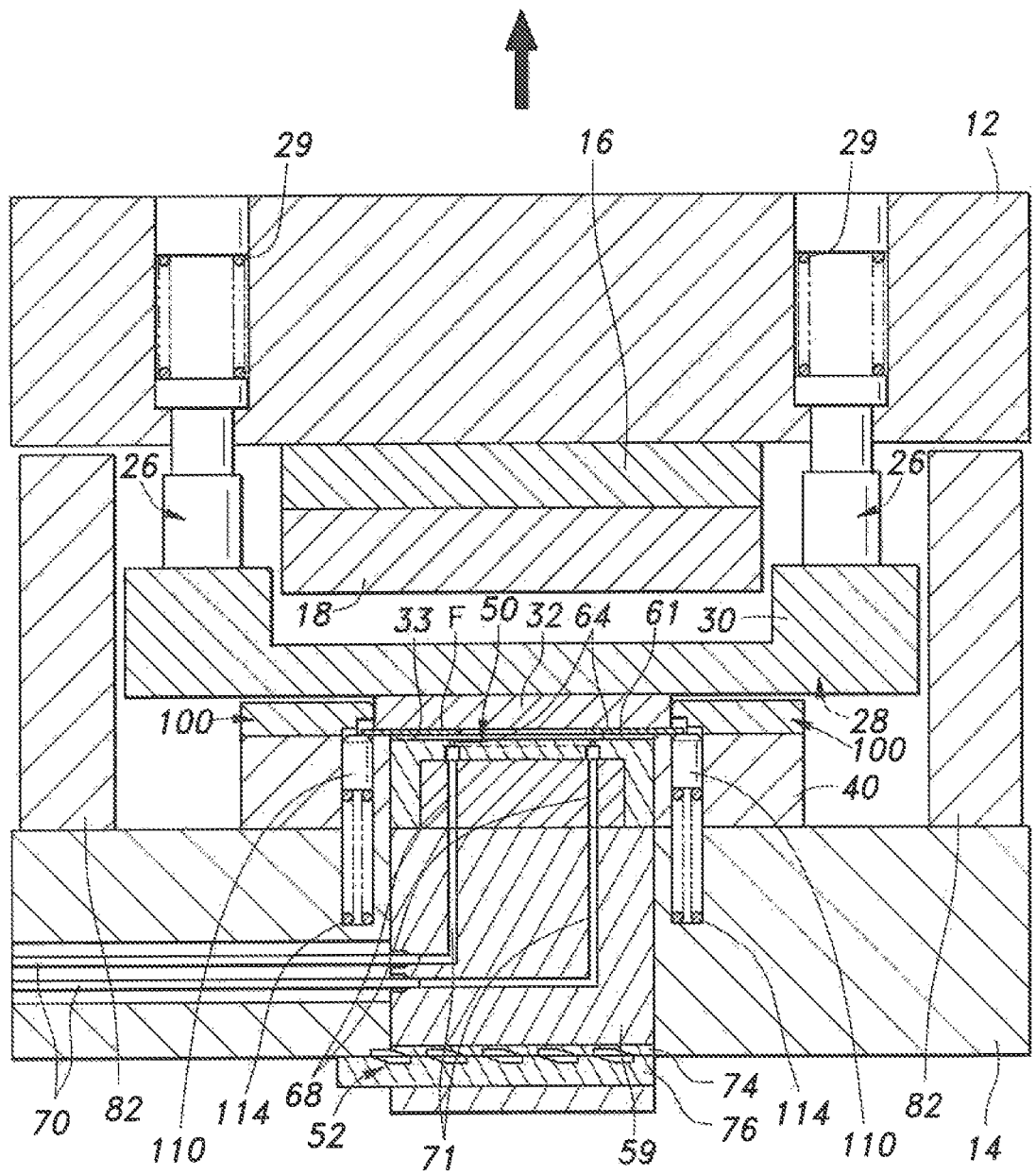
FIG. 13B is a cross-sectional view of the adhesive agent applying station of the manufacturing apparatus according to this embodiment in the ascending process 1.

As illustrated in FIG. 13A and FIG. 13B, when the punching of the inner shape IS and the transfer of the adhesive agent are finished, the upper holder 12 starts ascending from the bottom dead center. When the upper holder 12 ascends from the bottom dead center, the punch 22 for inner shape punching first comes out of the die 44 for inner shape punching in the upward direction. As described above, the stroke in which the stripper 28 moves relative to the upper holder 12 is larger than the maximum entering stroke in which the punch 22 for inner shape punching enters the die 44 for inner shape punching. Therefore, a state in which the strip F is pressed against the upper surface 47 of the die plate 40 by the stripper 28 is maintained until the punch 22 for inner shape punching comes out of the die 44 for inner shape punching.

As a result, even when vibration occurs by the friction when the punch 22 for inner shape punching comes out of the die 44 for inner shape punching and the punching opening in the strip F, the vibration is not transmitted to the part of the strip F in the adhesive agent applying station IV, whereby the transfer shape of the adhesive agent transferred to the application points E on the hoop material F does not lose shape or the adhesive agent is not scattered.

Figure 14B:
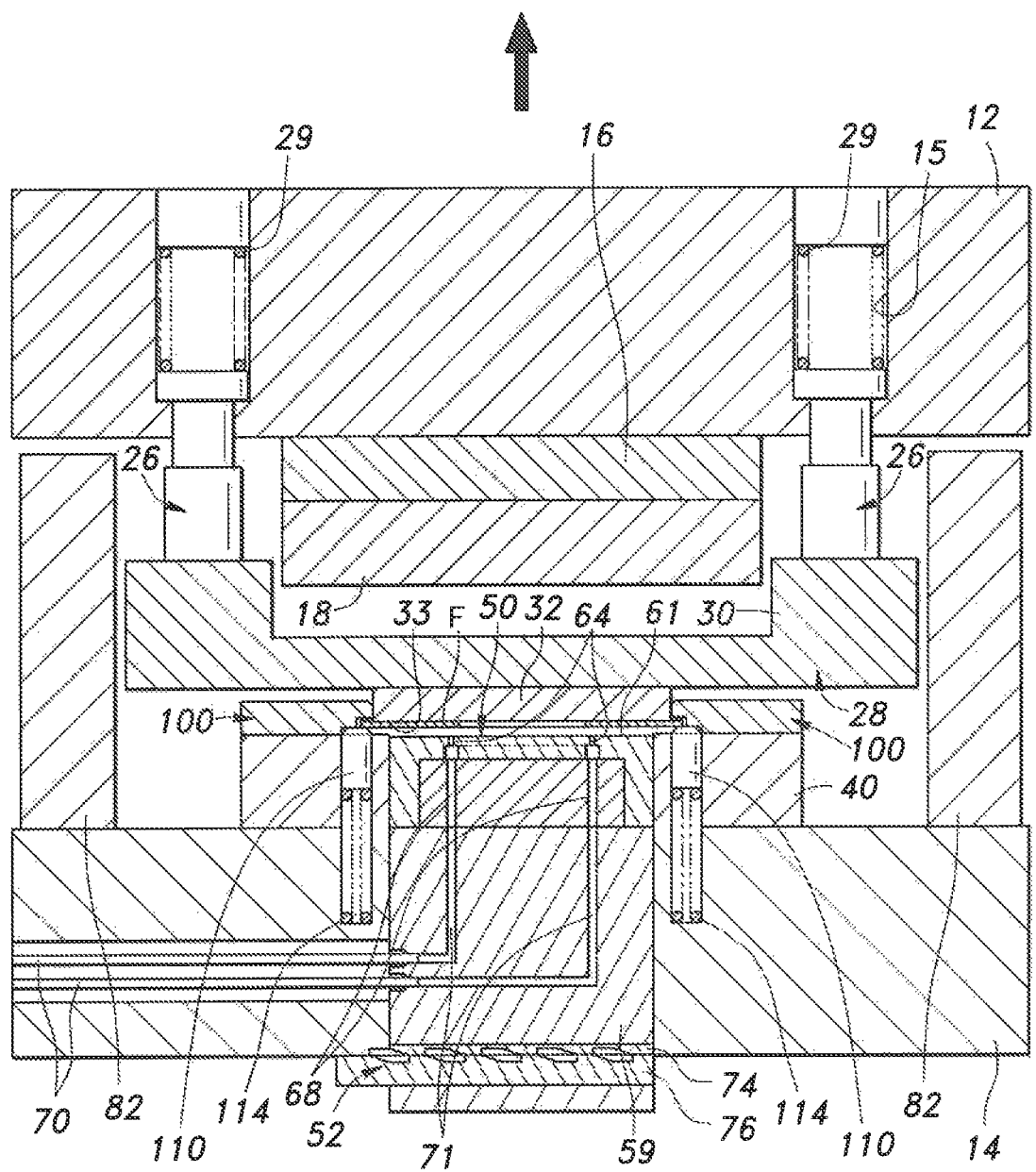
FIG. 14B is a cross-sectional view of the adhesive agent applying station of the manufacturing apparatus according to this embodiment in the ascending process 2.

As illustrated in FIG. 14A and FIG. 14B, as the ascent of the upper holder 12 proceeds, the stripper 28 ascends together with the upper holder 12, the lifter pins 110 ascend by the spring force of the lifter springs 114, and the strip F is lifted up. The lifter pins 110 come into abutment with the stopper surfaces 106, and hence the strip F returns to a raised position (lift up state) separated from the upper surface 47 of the die plate 40.

As illustrated in FIG. 19, the ascent of the strip F is performed in a state in which the strip F is prevented from shifting to the right and left directions by the guiding members 100, the stripper 28 is in abutment with the upper surface of the strip F, the lifter pins 110 are in abutment with the lower surface of the strip F, and the strip F is vertically supported by the stripper 28 and the lifter pins 110. Therefore, the swinging of the strip F in the ascending process is suppressed. As a result, in the ascending process (lift up process) of the strip F, the transfer shape of the adhesive agent transferred to the application points E on the strip F is prevented from losing shape or the adhesive agent is prevented from being scattered.

Figure 15B:
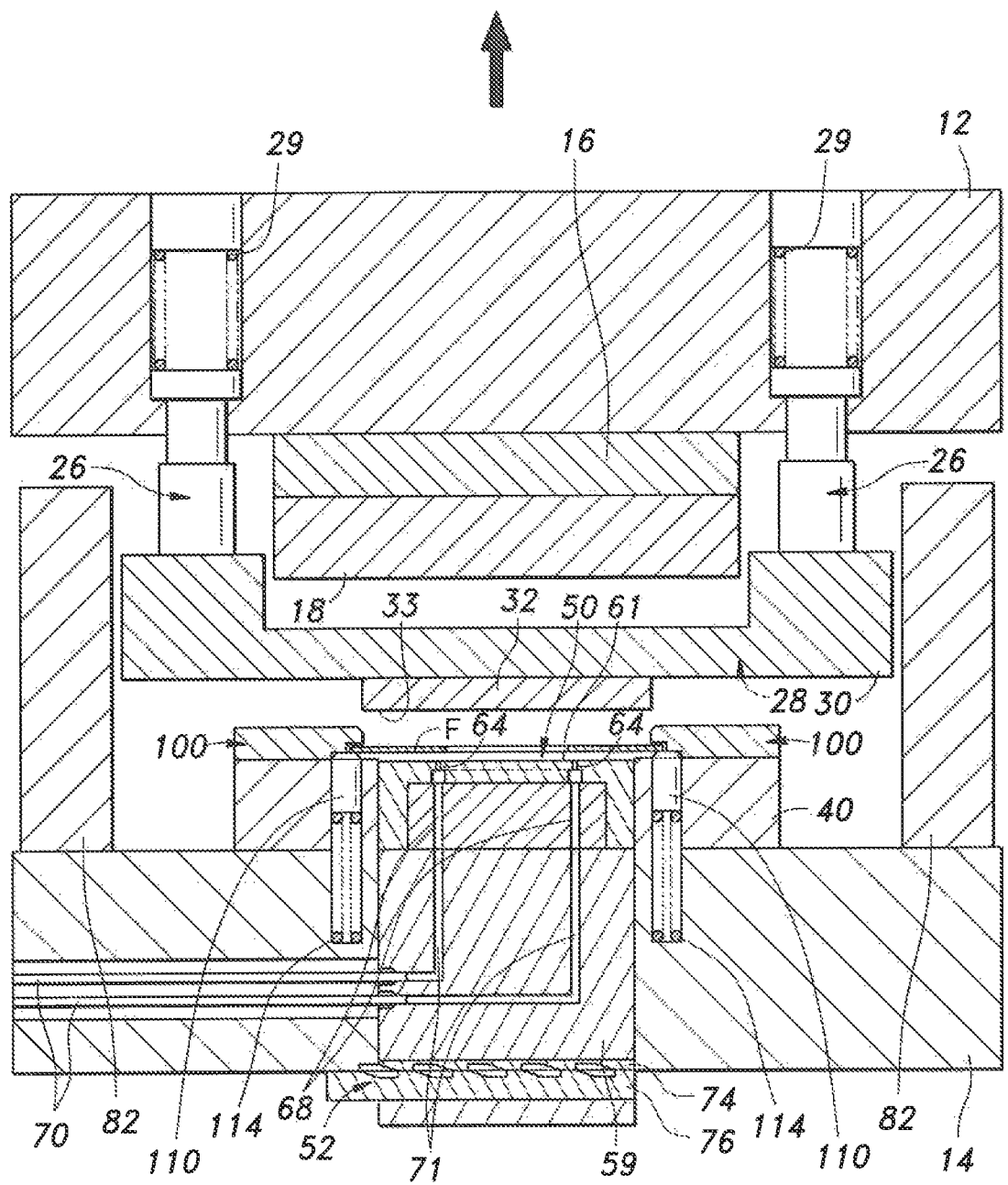
FIG. 15B is a cross-sectional view of the adhesive agent applying station of the manufacturing apparatus according to this embodiment in the ascending process 3.

As illustrated in FIG. 15A and FIG. 15B, as the ascent of the upper holder 12 further proceeds, the pilot pin 84 comes out of the pilot hole P in the upward direction. Then, the upper holder 12 returns to the top dead center position illustrated in FIG. 8A and FIG. 8B. The intermittent conveyance of the strip F starts at the time point at which the pilot pin 84 comes out of the pilot hole P. The intermittent conveyance is performed in a state in which the strip F is lifted up by the lifter pins 110 and the lower surface is separated from the upper surface 47 of the die plate 40 by the lift up amount L (see FIG. 16). Therefore, the adhesive agent transferred to the application points E on the lower surface of the strip F is not rubbed by the upper surface 47 of the die plate 40.

The intermittent conveyance is performed in a state in which the upward movement of the strip F is limited and the shifting of the strip F in the right and left directions is limited by the guiding members 100. Therefore, in the conveyance process of the strip F, the transfer shape of the adhesive agent transferred to the application points E on the strip F does not lose shape or the adhesive agent is not scattered. The intermittent conveyance finishes before the next punching step starts.

By the above, the adhesive agent is accurately applied on the adhesive agent applying surface of each iron core lamina W. In addition, the adhesive agent applied on the adhesive agent applying surface of each iron core lamina W does not spread to the surroundings and the transfer shape does not lose shape or the adhesive agent is not scattered. Thus, high-quality laminated iron cores can be stably produced even when they are small in size.

As another embodiment, as illustrated in FIG. 20, the pilot holes P may be formed in positions corresponding to places directly below pilot pin guide holes 108 formed in the guiding members 100 so as to pass therethrough. In that case, the pilot pins 84 are inserted into the pilot holes P with high accuracy in a state in which the flapping of the strip F is suppressed. In addition, each pilot pin 84 (see FIG. 8A) passes through the pilot pin guide hole 108 and enters the pilot hole P, and hence the positioning accuracy of the strip F by the pilot pins 84 is enhanced.

Next, another embodiment of the manufacturing apparatus 10 for the laminated iron core is described with reference to FIG. 21, FIG. 22A, and FIG. 22B. Note that, in FIG. 21, FIG. 21A, and FIG. 21B, the parts corresponding to those shown in FIG. 4, FIG. 8A and FIG. 8B are denoted by the same reference characters as the reference characters in FIG. 4, FIG. 8A and FIG. 8B, and description thereof is omitted.

In this embodiment, as illustrated in FIG. 21, the guiding members 100 are omitted, and lifter pins 120 also serve as the guiding members of the strip F. The lifter pins 120 are provided on both of right and left sides of the die plate 40, and the lifter pins 120 are provided with a predetermined interval therebetween in the progressive direction of the strip F.

Figure 22A:
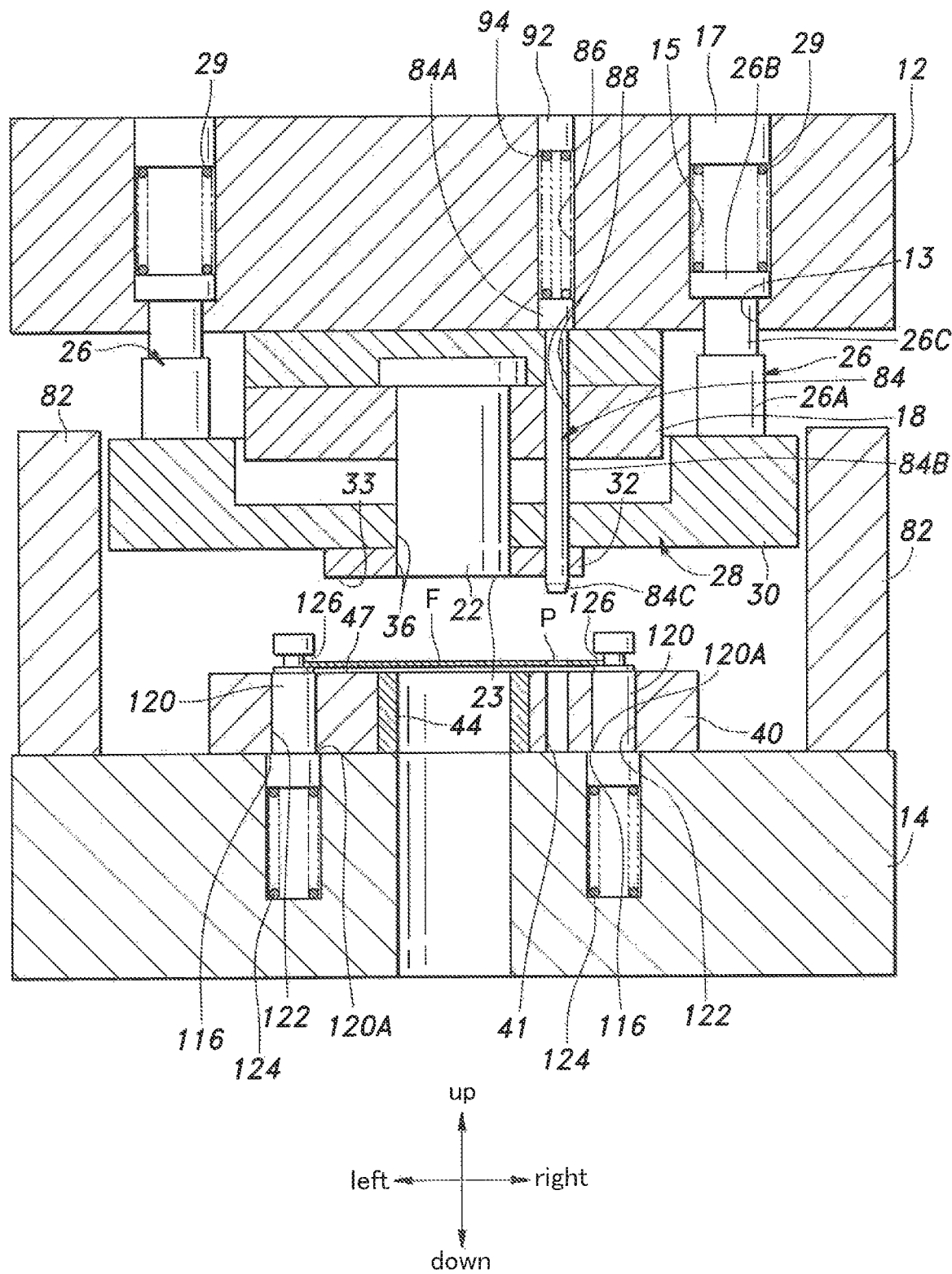
FIG. 22A is a cross-sectional view of an inner shape punching station of a manufacturing apparatus according to another embodiment in a top dead center state.
Figure 22B:
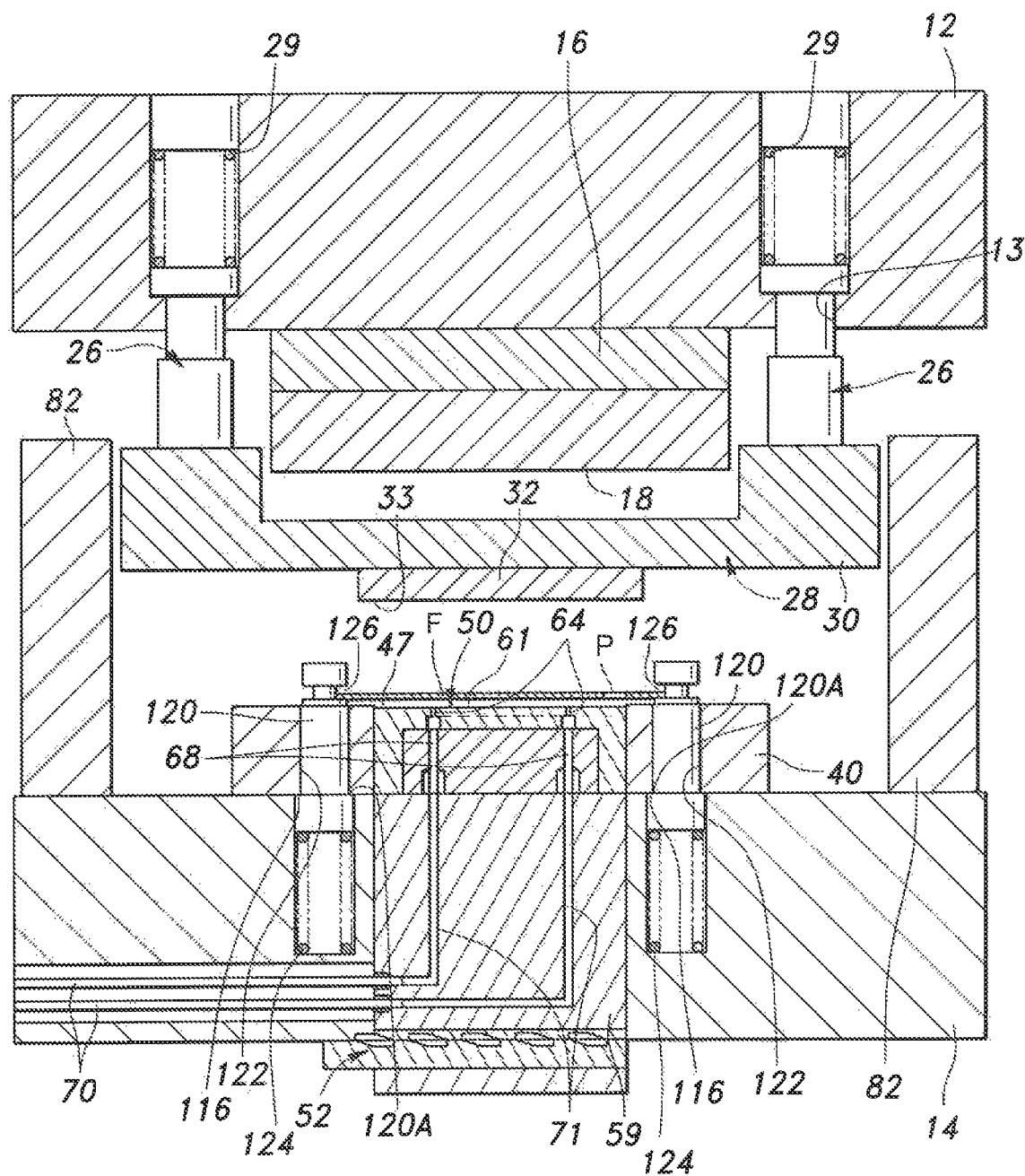
FIG. 22B is a cross-sectional view of an adhesive agent applying station of a manufacturing apparatus according to another embodiment in a top dead center state.

As illustrated in FIG. 22A and FIG. 22B, the lifter pins 120 are provided in lifter pin holes 122 so as to be displaceable in the vertical direction, and the upper end portions thereof protrude from the upper surface 47 of the die plate 40. The lifter pin holes 122 are formed in the die plate 40 and the lower holder 14 so as to open in the upper surface 47 of the die plate 40. Lifter springs 124 each consisting or a compression coil spring are provided between the lifter pins 120 and the bottom portions of the lifter pin holes 122. The lifter springs 124 bias the corresponding lifter pins 120 upward. When the strip F is not pressed down by the stripper 28, each lifter pin 120 is placed in a raised position in which a step portion 120A is in abutment with a shoulder portion 116 provided at a junction between the die plate 40 and the lower holder 14 by the spring bias of the lifter spring 124, and when the strip F is pressed down by the stripper 28, each lifter pin 120 is placed in a lowered position in which the lifter pin 120 is lowered by the strip F against the spring force of the lifter spring 124.

The lifter pins 120 each have a circumferential groove 126 in the outer circumference of a part protruding from the upper surface 47 of the die plate 40. The circumferential grooves 126 each have a rectangular cross-sectional shape as with the guide grooves 104 in the abovementioned embodiment. The right and left side edge portions of the strip F enter the circumferential grooves 126, and hence the strip F is raised (lifted up) from the upper surface 47 of the die plate 40 in the raised position, and the strip F is placed on the upper surface 47 of the die plate 40 in the lowered position. In addition, with the right and left side edge portions of the strip F entering the circumferential grooves 126 in the right and left lifter pins 120, the lifter pins 120 limit the movement of the strip F in the right and left directions and guide the intermittent conveyance of the strip F, and also limit the downward movement of the strip F in addition to the upward movement of the strip F when lift up is performed.

As a result, when the strip F is conveyed in an intermittent manner or when the adhesive agent is applied to the adhesive agent applying surface, the shifting of the strip F in the right and left directions and the upward and downward movement of the strip F are limited. By this limitation, the flapping of the strip F is suppressed, and the adhesive agent is accurately applied on the adhesive agent applying surface.

This embodiment is substantially the same as the abovementioned embodiment other than the abovementioned lift up structure of the strip F by the lifter pins 120, and hence the effect of the abovementioned embodiment is obtained also in this embodiment.

In this embodiment, the lifter pins 120 also serve as the guiding members of the strip F, and hence the number of parts is reduced.

Other embodiments of the manufacturing apparatus for the laminated iron core according to the present invention are as follows.

(1) A manufacturing apparatus for a laminated iron core formed by stacking and bonding iron core laminae each formed by punching a sheet steel strip into a predetermined shape, the manufacturing apparatus including: an upper holder and a lower holder; a plurality of punches and dies provided on the upper holder and the lower holder, respectively, the plurality of punches and dies sequentially punching the iron core laminae from the sheet steel strip conveyed in an intermittent manner; a pilot pin provided on the upper holder, the pilot pin being configured to be inserted through a pilot hole formed in the sheet steel strip so as to perform positioning of the sheet steel strip in each conveyance position; and an adhesive agent applying apparatus provided on at least one of the upper holder and the lower holder, the adhesive agent applying apparatus applying an adhesive agent to an adhesive agent applying surface at a section of the sheet steel strip corresponding to each iron core lamina.

(2) A manufacturing apparatus for a laminated iron core formed by stacking and bonding iron core laminae each formed by punching a sheet steel strip into a predetermined shape, the manufacturing apparatus including: an upper holder and a lower holder; a plurality of punches and dies provided on the upper holder and the lower holder, respectively, the plurality of punches and dies sequentially punching the iron core laminae from the sheet steel strip conveyed in an intermittent manner; a stripper plate provided on the upper holder so as to be displaceable in a vertical direction, the stripper plate having a lower surface opposed to upper surfaces of the dies; and an adhesive agent applying apparatus provided on at least one of the upper holder and the lower holder, the adhesive agent applying apparatus applying an adhesive agent to an adhesive agent applying surface at a section of the sheet steel strip corresponding to each iron core lamina. In that case, the manufacturing apparatus for the laminated iron core may further include a stripper spring that biases the stripper plate toward the lower holder, and the lower surface of the stripper plate may be configured to press the sheet steel strip against the upper surfaces of the dies by a spring force of the stripper spring. Further, the stripper plate may be configured to press the sheet steel strip against the upper surfaces of the dies by the lower surface until the punches comes out of the dies.

(3) A manufacturing apparatus for a laminated iron core formed by stacking and bonding iron core laminae each formed by punching a sheet steel strip into a predetermined shape, the manufacturing apparatus including: an upper holder and a lower holder; a plurality of punches and dies provided on the upper holder and the lower holder, respectively, the plurality of punches and dies sequentially punching the iron core laminae from the sheet steel strip conveyed in an intermittent manner; a plurality of lifters provided on the lower holder so as to be displaceable in a vertical direction, the plurality of lifters separating the sheet steel strip from upper surfaces of the dies by coming into abutment with a lower surface of the sheet steel strip; and an adhesive agent applying apparatus provided on at least one of the upper holder and the lower holder, the adhesive agent applying apparatus applying an adhesive agent to an adhesive agent applying surface at a section of the sheet steel strip corresponding to each iron core lamina. In that case, a plurality of lifter springs that bias the lifters upward so as to separate the sheet steel strip from the upper surfaces of the dies with the sheet steel strip being vertically supported by the stripper plate and the lifters when the stripper plate ascends may be further included.

Preferred embodiments of the present invention have been described above, but the present invention is not limited to the embodiments as above and can be modified, as appropriate, without departing from the spirit of the present invention as a person skilled in the art would easily understand.

For example, the application table 60 of the adhesive agent (first adhesive agent liquid) may repeatedly descend and ascend in synchronization with the press operation instead of descending only when iron core laminae for separation are formed. The hardening accelerator or the initiator (second adhesive agent liquid) may be continuously applied or may be applied only when the strip F stops. In addition, the hardening accelerator or initiator (second adhesive agent liquid) may be applied to the entire strip F or a part of the strip F. In addition, a plurality of the adhesive agent accumulation portions 62 may be provided, such that the adhesive agent may be supplied to the discharge holes 64 in respective areas from the adhesive agent accumulation portions 62. The adhesive agent may be continuously supplied to the adhesive agent accumulation portion 62 or may be intermittently supplied to the adhesive agent accumulation portion 62 in synchronization with the press operation. The application of the adhesive agent is not limited to transferring, and a jet-type emission application may be used. The application of the adhesive agent to the strip F may be performed on the upper surface of the strip F or both surfaces, that is, the lower surface and the upper surface. The application shape of the adhesive agent is not limited to a round dot shape, and may be an annular shape, a triangle, a square, a deformed shape, and the like.

In some types of laminated iron cores, the inner shape punching is unnecessary. In that case, the inner shape punching only needs to be omitted. In addition, the pilot pin 84 is not essential. As the shape of the laminated iron core in plan view, a square, a T-shape, a U-shape, and the like may be used besides an annular shape and a circular shape.

The strip F does not necessarily need to be pressed against the upper surfaces of the die plate 40, the dies 44, 42, and 46, and the application table 60 by the stripper plate 32, and the stripper plate 32 may be configured to limit the displacement of the strip F in the vertical direction between the stripper plate 32 and the upper surfaces of the die plate 40, the dies 44 and 46, and the application table 60 until the punches 22 and 24 come out from the dies 44 and 46.

The arrangement of the stripper plate 32 and the lifter pins 110 may be such an arrangement in that the stripper plate 32 and the lifter pins 110 overlap each other in plan view so as to vertically sandwich the strip F therebetween other than the arrangement in which the stripper plate 32 and the lifter pins 110 are offset in the right and left directions so as not to overlap each other in plan view. The lifter pins 110 may be arranged in an intermediate portion in the strip F in the right and left directions.

The application of the adhesive agent by the adhesive agent applying apparatus 50 is preferred to be performed directly before the outer diameter punching step in view of the carrying distance of the strip F after applying the adhesive agent becoming short, but does not necessarily need to be directly before the outer diameter punching step. The heating step and the rotative stacking step are not essential.

In addition, not every component described in the above-mentioned embodiments is essential, and the components to be employed can be selected, as appropriate, without departing from the gist of the present invention. For example, the pilot pins, the guiding members, and the stripper structure are not essential, and may be omitted.

REFERENCE SIGNS LIST 10 manufacturing apparatus
12 upper holder
13 through hole
14 lower holder
15 spring chamber
16 back plate
17 plug
18 punch plate
20 punch for pilot hole punching
22 punch for inner shape punching
24 punch for outer shape punching
26 knock-out
26A lower end
26B upper end flange
26C shaft portion
28 stripper
29 stripper spring
30 stripper main body
32 stripper plate
33 lower surface
34 punch insertion hole
36 punch insertion hole
38 punch insertion hole
40 die plate
41 pin relief hole
42 die for pilot hole punching
44 die for inner shape punching
46 die for outer shape punching
47 upper surface
48 outlet hole
50 adhesive agent applying apparatus
52 cam mechanism
54 driving apparatus
56 holding hole
58 upper block
59 lower block
60 application table
61 upper surface
62 adhesive agent accumulation portion
64 discharge hole
66 inner block
68 adhesive agent supplying passage
70 adhesive agent supplying tube
72 adhesive agent supplying apparatus
74 fixed cam
74A sawtooth protruding portion
74B sawtooth recessed portion
76 moving cam
76A sawtooth protruding portion
76B sawtooth recessed portion
82 stopper
84 pilot pin
84A upper end flange
84B straight shaft portion
84C lower end tapered shaft portion
86 mounting hole
88 through hole
90 through hole
92 plug
94 compression coil spring
100 guiding member
102 lower surface
103 side surface
104 guide groove
106 stopper surface
108 pilot pin guide hole
110 lifter pin
112 lifter pin hole
114 lifter spring
116 shoulder portion
120 lifter pin
120A step portion
122 lifter pin hole
124 lifter spring
126 circumferential groove
I pilot hole punching station
II inner shape punching station
III idle station
IV adhesive agent applying station
V idle station
VI outer shape punching station
VII idle station
T predetermined interval
L lift up amount
A iron core lamina
W iron core lamina
M laminated iron core
F strip (sheet steel strip)
E application point
E1 application point
E2 application point
G iron core lamina group

The invention claimed is:

1. A manufacturing method for a laminated iron core formed by laminating and bonding iron core laminae each formed by punching a sheet steel strip into a predetermined shape with use of a press apparatus comprising an upper holder and a lower holder, the manufacturing method comprising:

conveying the sheet steel strip in an intermittent manner in a lift up state in which the sheet steel strip is separated from an upper surface of a die plate provided on the lower holder by a lifter provided on the lower holder so as to be vertically movable and biased upward by a lifter spring in a raised state of the upper holder, with an upward movement of the sheet steel strip being limited and conveyance of the sheet steel strip along an intermittent conveyance direction being guided by a guiding member provided on the lower holder;

punching an outer shape of each of the iron core laminae with a punch and a die for outer shape punching included in a plurality of punches and dies provided on the upper holder and the lower holder, respectively, by lowering the upper holder;

applying an adhesive agent to an adhesive agent applying surface of the sheet steel strip with an adhesive agent applying apparatus provided on at least one of the upper holder and the lower holder before the punching of the outer shape of each of the iron core laminae;

inserting a pilot pin provided on the upper holder into a pilot hole formed in the sheet steel strip in middle of descent of the upper holder after the conveying of the sheet steel strip finishes; and pressing, in middle of descent of the upper holder after the inserting of the pilot pin finishes, the sheet steel strip against the upper surface of the die plate provided on the lower holder with a stripper plate provided on the upper holder so as to be displaceable in a vertical direction and having a lower surface opposed to the upper surface of the die plate, along with a descending movement of the lifter, the stripper plate being biased toward the lower holder by a stripper spring, wherein the applying of the adhesive agent comprises applying the adhesive agent in a state in which the pilot pin is inserted in the pilot hole and when the sheet steel strip is about to be pressed against or is being pressed against the upper surface of the die plate by the stripper plate along with the descending movement of the lifter, and returning the sheet steel strip to the lift up state by raising the upper holder after application of the adhesive agent finishes, with the lifter being in abutment with a lower surface of the sheet steel strip along with an ascending movement of the lifter and with the stripper plate being in abutment with the upper surface of the sheet steel strip.

2. The manufacturing method for a laminated iron core according to claim 1, wherein the applying of the adhesive agent comprises transferring the adhesive agent to each of application points set on a plurality of predetermined positions on the adhesive agent applying surface by discharging the adhesive agent toward the adhesive agent applying surface from each of a plurality of discharge holes.

3. The manufacturing method for a laminated iron core according to claim 2, wherein each iron core lamina comprises a plurality of teeth portions, and has at least one of the application points placed on the teeth portion.

\* \* \* \* \*